US008079040B2

(12) United States Patent
Schoenfeld et al.

(10) Patent No.: US 8,079,040 B2
(45) Date of Patent: Dec. 13, 2011

(54) LOADING AND UNLOADING MECHANISM FOR DATA STORAGE CARTRIDGE AND DATA DRIVE

(75) Inventors: David Schoenfeld, Thornton, CO (US); Gregory P. Hertrich, Longmont, CO (US); Keith Malang, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 1395 days.

(21) Appl. No.: 11/447,033

(22) Filed: Jun. 6, 2006

(65) Prior Publication Data
US 2007/0283369 A1 Dec. 6, 2007

(51) Int. Cl.
G11B 17/03 (2006.01)
G11B 33/02 (2006.01)
(52) U.S. Cl. .......................... 720/633; 720/635; 720/647
(58) Field of Classification Search .......... 720/627–629, 720/630–644; 360/98.04–98.08, 99.02–99.03, 360/99.05–99.07, 99.12
See application file for complete search history.

(56) References Cited

U.S. PATENT DOCUMENTS

| 4,989,197 | A | * | 1/1991 | Bessho et al. ................. 720/641 |
| 5,058,124 | A | | 10/1991 | Cameron et al. |
| 5,481,423 | A | * | 1/1996 | Aoki ............................. 720/641 |
| 5,526,337 | A | | 6/1996 | Housey et al. |
| 5,650,990 | A | * | 7/1997 | Choi ............................. 720/641 |
| 5,719,691 | A | | 2/1998 | Curtis et al. |
| 5,748,606 | A | | 5/1998 | Nakagawa et al. |
| 5,764,612 | A | | 6/1998 | Tanaka et al. |
| 6,047,008 | A | | 4/2000 | Funakawa |
| 6,191,875 | B1 | | 2/2001 | Curtis et al. |
| 6,201,782 | B1 | | 3/2001 | Tanaka et al. |
| 6,249,504 | B1 | | 6/2001 | Iwanaga |
| 6,275,459 | B1 | | 8/2001 | Obata et al. |
| 6,388,983 | B1 | | 5/2002 | Kikuchi |
| 6,392,836 | B1 | * | 5/2002 | Kim ......................... 360/96.51 |
| 6,414,763 | B1 | | 7/2002 | Hesselink et al. |
| 6,449,627 | B1 | | 9/2002 | Baer et al. |
| 6,614,566 | B1 | | 9/2003 | Curtis et al. |
| 7,092,133 | B2 | | 8/2006 | Anderson et al. |
| 2005/0028180 | A1 | | 2/2005 | Hertrich |
| 2005/0028185 | A1 | | 2/2005 | Hertrich |
| 2005/0028186 | A1 | | 2/2005 | Hertrich |

OTHER PUBLICATIONS

PCT/US2007/06094 International Search Report and the Written Opinion of the International Searching Authority, or the Declaration, mailed Aug. 22, 2008.
PCT/US2006/19906 International Search Report and the Written Opinion of the International Searching Authority, or the Declaration, mailed Sep. 16, 2008.

* cited by examiner

Primary Examiner — Nathan Danielsen
(74) Attorney, Agent, or Firm — Vedder Price P.C.; Ajay A. Jagtiani

(57) ABSTRACT

The present invention provides loading and unloading mechanisms, and data drives for data storage cartridges. Embodiments of the cartridge loading and unloading mechanisms for a data storage cartridge may: operate in a manner such that the drive door of the data drive may be fully closed before the disk medium is exposed, e.g., before opening of the associated shutter of the cartridge; be powered by the same drive motor assembly that is used to move or transport the cartridge to the optical head assembly used for writing and/or reading of data from the disk medium of the cartridge; and may fit within a standard configuration for a data drive. Embodiments of the cartridge loading and unloading mechanisms, as well as the data drives, may provide reliable operation, ease of assembly, and of the parts and components necessary for the reliable operation, and positive data cartridge positioning, as well as minimizing backlash in the drive motor/gear assembly.

7 Claims, 14 Drawing Sheets

LOADING AND UNLOADING MECHANISM FOR DATA STORAGE CARTRIDGE AND DATA DRIVE

BACKGROUND

1. Field of the Invention

The present invention relates generally to loading and unloading mechanisms for a data storage cartridge, as well as data drives comprising such mechanisms.

2. Related Art

Data storage cartridges have been used to house removable data storage media. The cartridge typically comprises a housing that serves as a protective enclosure for a disk medium. In the past, this disk medium has been in the form of a magneto-optical (MO) disk medium. However, another type of data storage system, known as holographic storage, is described in, for example, U.S. Pat. No. 5,719,691 (Curtis et al.), issued Feb. 17, 1998, and U.S. Pat. No. 6,191,875 (Curtis et al.), issued Feb. 20, 2001. It may be desirable that the holographic data storage (HDS) medium be provided in a disk form and housed in a cartridge similar to those used for an MO disk medium. This enables HDS manufacturers to utilize existing MO cartridge designs and handling mechanisms for easy conversion to HDS applications. See, for example, commonly assigned U.S. Patent Application 2005/0028185 (Hertrich), published Feb. 5, 2005 and U.S. Patent Application 2005/0028186 (Hertrich), published Feb. 5, 2005, the entire disclosure and contents of which are incorporated by reference, for some illustrative data storage cartridges for holographic disk media.

These removable data storage cartridges may comprise a disk-shaped data storage medium having a rotatable hub provided or attached at the center of the disk medium, and are inserted into data storage drives that can read data from and write data to such removable data cartridges. Some data storage drives include a "soft load" mechanism, which receives a data cartridge inserted into a load port of the drive, and translates the cartridge to couple the hub in the data cartridge with a spindle mechanism in the drive. The loading mechanism often translates the cartridge first in a lateral direction to draw the cartridge fully into the drive, and then in a downward direction to lower the cartridge onto the stationary drive spindle. After coupling, the drive spindle rotates the data storage disk medium (typically circular shaped) past a radially positionable read/write head, which may read data from and/or write data to various locations on the data storage medium.

In a conventional HDS drive system, the HDS cartridge is inserted through the drive door of the data drive. After insertion, a sensor is often triggered to indicate that the HDS cartridge may be loaded onto the drive spindle. The mechanism for loading (as well as unloading) the cartridge onto the drive spindle is typically powered by one motor with the proper gear reduction necessary to overcome the forces required for either loading or unloading the cartridge. Another separate motor is then typically used to move or transport the loaded cartridge underneath a stationary optical head assembly used to write and/or read data from the disk medium within the HDS cartridge. This transporting/loading process is then reversed to unload or eject the HDS cartridge from the data drive.

At some point during the loading of the HDS cartridge and transportation underneath the optical head assembly, a shutter associated with the cartridge may be opened to expose the disk medium for writing and/or reading of data by the optical head assembly. For HDS cartridges, it is important that the loading/unloading mechanism for the cartridge operate in a manner such that the drive door of the data drive is fully closed before this shutter is opened. In addition, the loading/unloading mechanism for the HDS cartridge should desirably fit within the standard configuration for a data drive, which is typically a width of no more than about 5.75 inches (14.61 cm.) and a height of no more than about 3.25 inches (8.26 cm). Further, the cartridge loading/unloading mechanism should provide for reliable operation, as well as ease of assembly.

SUMMARY

According to a first broad aspect of the present invention, there is provided a device comprising a data storage cartridge loading and unloading mechanism comprising:
 a cartridge carrier for releasably receiving a data cartridge and for moving the data cartridge towards or away from a data cartridge coupler and for moving the data cartridge laterally between cartridge loaded and unloaded positions;
 at least two carrier cam members associated with the cartridge carrier;
 a pair of laterally spaced apart carrier guide members, each carrier guide member having at least one carrier guide cam slot to receive one of the at least two carrier cam members, each carrier guide cam slot being configured:
  to permit the cartridge carrier to move laterally between cartridge loaded and unloaded positions; and
  to cause the cartridge carrier to move towards or away from the data cartridge coupler in response to movement of the one carrier cam member within the carrier guide cam slot between cartridge loaded and unloaded positions;
 wherein the cartridge carrier moves the data cartridge laterally between cartridge loaded and unloaded positions in response to lateral movement of a carrier transporter.

According to a second broad aspect of the present invention, there is provided a data storage cartridge loading and unloading mechanism for a data drive comprising a drive door movable between closed and opened positions, and a data cartridge coupler associated with the loading and unloading mechanism, wherein the loading and unloading mechanism comprises:
 a cartridge carrier for releasably receiving a data cartridge and for moving the data cartridge towards or away from a data cartridge coupler and for moving the data cartridge laterally between cartridge loaded and unloaded positions;
 at least two carrier cam members associated with the cartridge carrier;
 a pair of laterally spaced apart carrier guide members, each carrier guide member having at least one carrier guide cam slot to receive one of the at least two carrier cam members, each carrier guide cam slot being configured:
  to permit the cartridge carrier to move laterally between cartridge loaded and unloaded positions; and
  to cause the cartridge carrier to move towards or away from the data cartridge coupler in response to movement of the one carrier cam member within the carrier guide cam slot between cartridge loaded and unloaded positions; and
 means for moving the drive door to opened and closed positions in response to lateral movement of the cartridge carrier;

wherein when the loading and unloading mechanism moves:
away from the drive door, the carrier cartridge is caused to move towards the data cartridge coupler and to a coupled position; or
towards the drive door and towards an unloading position, the carrier cartridge is caused to move away from the data cartridge coupler and to an uncoupled position.

According to a third broad aspect of the present invention, there is provided a data drive comprising:
a carrier transporter movable laterally between cartridge loaded and unloaded positions;
a data cartridge coupler associated with the carrier transporter which moves laterally in response to lateral movement of the carrier transporter;
a drive motor assembly for causing the carrier transporter to move laterally between cartridge loaded and unloaded positions;
a data storage cartridge loading and unloading mechanism comprising:
a cartridge carrier for releasably receiving a data storage cartridge and for moving the data cartridge towards or away from a data cartridge coupler and for moving the data cartridge laterally between cartridge loaded and unloaded positions;
at least two carrier cam members associated with the cartridge carrier;
a pair of laterally spaced apart carrier guide members, each carrier guide member having at least one carrier guide cam slot to receive one of the at least two carrier cam members, each carrier guide cam slot being configured:
to permit the cartridge carrier to move laterally between cartridge loaded and unloaded positions; and
to cause the cartridge carrier to move towards or away from the data cartridge coupler in response to movement of the one carrier cam member within the carrier guide cam slot between cartridge loaded and unloaded positions;
wherein the cartridge carrier moves the data cartridge laterally between cartridge loaded and unloaded positions in response to the lateral movement of the carrier transporter.

According to a fourth broad aspect of the present invention, there is provided a data drive comprising:
a drive door pivotally mounted for pivotal movement between opened and closed positions;
a pair of laterally spaced apart first and second carrier guide panels, wherein the drive door is pivotally mounted at a forward end of each carrier guided panel for pivotal movement between opened and closed positions;
each of the carrier guide panels having a primary carrier guide cam slot and wherein the first carrier guide panel has a secondary carrier guide cam slot spaced from the primary carrier guide slot, each of the carrier guide cam slots receiving one carrier cam member for movement therein and comprising:
a forward elongated longitudinal slot segment extending rearwardly along a first longitudinal axis;
an intermediate slot segment extending rearwardly from the forward slot segment and slanting downwardly relative to the first longitudinal axis; and
a rearward elongated longitudinal slot segment extending rearwardly from the intermediate slot segment along a second longitudinal axis below the first longitudinal axis;
a cartridge carrier for releasably receiving a data storage cartridge and for moving the data cartridge towards or away from a data cartridge coupler and for moving the data cartridge laterally between cartridge loaded and unloaded positions, the cartridge carrier having laterally spaced apart first and second sides;
first and second spaced apart carrier cam members associated with the first side of the cartridge carrier, each of the first and second carrier members being received by one of the primary and secondary carrier guide cam slots of the first guide panel for movement therein;
a third carrier cam member associated with the second side of the cartridge carrier and being received by the primary carrier guide cam slot of the second guide panel for movement therein;
means associated with the first or second sides of the cartridge carrier for causing the drive door to pivot to opened or closed positions in response to lateral movement of the cartridge carrier;
wherein the cartridge carrier:
moves laterally towards or away from the drive door in response to lateral movement of a carrier transporter; and
moves towards or away from the data cartridge coupler to coupled and uncoupled positions in response to movement of the carrier cam members within the intermediate slot segments of the carrier guide cam slots.

BRIEF DESCRIPTION OF THE DRAWINGS

The invention will be described in conjunction with the accompanying drawings, in which.

DETAILED DESCRIPTION

Figure 1:
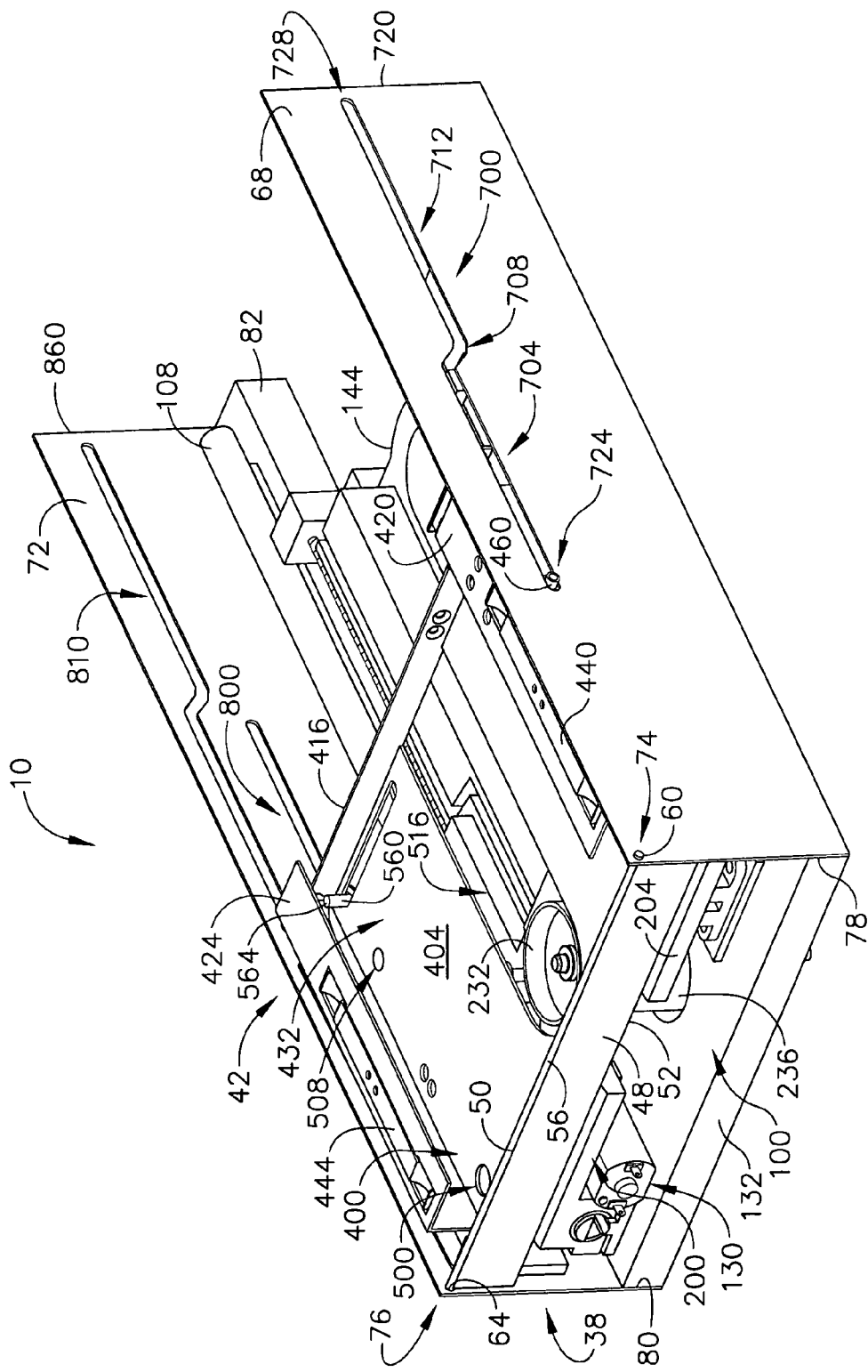
FIG. 1 is a top perspective view showing a data drive and data cartridge loading and unloading mechanism in accordance with one embodiment of the present invention with the data storage cartridge ready to be inserted for loading.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "above", "below", "left", "right", etc. are merely used for convenience in describing the various embodiments of the data drive and data cartridge loading and unloading mechanisms of the present invention. The data drive and data cartridge loading and unloading mechanisms of the present invention may be oriented in various ways. For example, the embodiments shown in FIGS. 1 through 14 could be flipped over, rotated by 90° in any direction, etc.

For the purposes of the present invention, the term "disk medium" refers to any medium usable with a data storage cartridge for recording (writing) and/or reading data, including magneto-optical (MO) data storage disk mediums, holographic disk mediums, etc.

For the purposes of the present invention, the term "holographic disk medium" refers to a disk medium for recording (writing) and/or reading data, in three dimensions (i.e., the X, Y and Z dimensions), one or more holograms as one or more pages as patterns of varying refractive index imprinted into the medium. Embodiments of the holographic disk medium often have a circular shape and comprise a pair of laterally spaced apart first and second sides or surfaces (often an upper side/surface and a lower side/surface) and a peripheral circular edge.

For the purposes of the present invention, the terms "holographic grating," "holograph" or "hologram" (collectively and interchangeably referred to hereafter as "hologram" ) are used in the conventional sense of referring to a recorded interference pattern formed when a signal beam and a reference beam interfere with each other. In cases where digital data is recorded, the signal beam may be encoded with a spatial light modulator.

For the purposes of the present invention, the term "holographic recording" refers to a hologram after it is recorded in the holographic disk medium.

For the purposes of the present invention, the term "data page" or "page" refers to the conventional meaning of data page as used with respect to holography. For example, a data page may be a page of data, one or more pictures, etc., to be recorded or recorded in a holographic disk medium.

For the purposes of the present invention, the term "recording data" refers to writing, storing, etc., to a disk medium, for example, one or more holograms on or in a holographic disk medium.

For the purposes of the present invention, the term "reading data" refers to retrieving or recovering data stored on a disk medium, for example one or more holograms on or in a holographic disk medium.

For the purposes of the present invention, the term "data storage cartridge" refers to a magneto-optical (MO) data storage cartridge, a holographic data storage (HDS) cartridge, etc., that may comprise a protective housing and a disk medium for recording (writing) and/or reading data that is usually movable, and is often rotatable, within the housing. For data storage cartridges containing a rotatable disk medium, such as HDS cartridges, the data storage cartridge is often coupled with a rotatable data cartridge coupler (e.g., a drive spindle of a spindle drive assembly, etc.) that rotates the disk medium within the housing.

For the purposes of the present invention, the term "data cartridge coupler" refers to a component or mechanism that the data storage cartridge is coupled with when in a loaded position. The data cartridge coupler often moves, or more typically rotates, the disk medium within the data storage cartridge, e.g., may be a data cartridge drive spindle, etc.

For the purposes of the present invention, the term "data drive" refers to a system, assembly, device, etc., into which a data storage cartridge is inserted for loading/unloading of the cartridge, writing and/or reading data to or from the disk medium within the cartridge, etc. The data drive may comprise various components, including a data cartridge coupler (e.g., a drive spindle of a spindle drive assembly) for coupling a holographic disk medium thereto, a drive door assembly for receiving and/or ejecting the disk medium (alone or as part of a data storage cartridge), a data cartridge loading/unloading mechanism for coupling or uncoupling the data storage cartridge to or from the data cartridge coupler, and for optionally translating the cartridge/coupler combination to and/or from a write/read head for writing (recording) data to and/or reading data from the disk medium, etc.

For the purposes of the present invention, the term "cartridge loading and unloading mechanism" refers to a mechanism used to load/couple, unload/uncouple, or reversibly load/couple and unload/uncouple a data storage cartridge to or from a data cartridge coupler after insertion into a data drive.

For the purposes of the present invention, the terms "unloading" and "ejecting" and similar terms are used interchangeably herein to refer to when the data cartridge is moved or otherwise positioned for manual removal from the data drive.

For the purposes of the present invention, the term "write/read head" refers to any device, assembly, mechanism, etc., that can write (record) and/or read data to and/or from the disk medium within the data storage cartridge.

Description

The present invention provides loading and unloading mechanisms, and data drives, for data storage cartridges. Embodiments of the present invention relate to loading and unloading mechanisms for a data storage cartridge that operate in a manner such that the drive door of the data drive may be fully closed before the disk medium is exposed, e.g., before opening of the associated shutter of the data cartridge. An embodiment of the present invention also relates to a loading and unloading mechanism for a data storage cartridge that may be powered by the same drive motor assembly that is used to move or otherwise transport the data cartridge reversibly to and from the write/read head assembly used for writing and/or reading of data from the disk medium of the data cartridge. Embodiments of the present invention further relate to loading and unloading mechanisms for data storage cartridges that may fit within a standard configuration for a data drive (e.g., in terms of width of the data drive, etc.). Embodiments of the present invention further relate to loading and unloading mechanisms, as well as data drives, for data storage cartridges that may provide for reliable operation, ease of assembly, as well as simplification of the parts and components necessary for the reliable operation of the loading and unloading mechanism, data drive, etc. Embodiments of the present invention further relate to loading and unloading mechanisms, as well as data drives, that may provide positive data cartridge positioning, as well as minimizing backlash in the drive motor/gear assembly.

The various embodiments of the present invention are illustrated by reference to the drawings. Referring to FIG. 1, a data drive is indicated generally as 10 that may be provided as part of, for example, a data cartridge library or other computer system. Data drive 10 reversibly may receive, for example, a generally square-shaped data storage cartridge. The data cartridge often comprises a protective housing that that may be provided with a shutter that, when opened, uncovers an upper disk medium aperture to expose a portion of a generally circular disk medium that rotates within housing. There may also be a corresponding lower disk medium aperture on the underside of housing. Illustrative holographic data storage (HDS) cartridges that may be useful herein as is or with appropriate modification are disclosed in commonly assigned U.S. Patent Application 2005/0028185 (Hertrich), published Feb. 5, 2005 and in commonly assigned U.S. Patent Application 2005/0028186 (Hertrich), published Feb. 5, 2005, the entire disclosures and contents of which are incorporated by reference.

Referring again to FIG. 1, data drive 10 comprises a drive door assembly, indicated generally as 38, and a cartridge loading and unloading ("loader/unloader") mechanism, indicated generally as 42, which is configured to move or otherwise translate the data cartridge (not shown) laterally from a loaded position to an unloaded/ejected position and from an unloaded/ejected position to a loaded position, i.e., loading and unloading/ejecting of the cartridge is generally reciprocal and reversible. Drive door assembly 38 is shown in FIG. 1 as having a generally rectangular drive door 48. Drive door assembly 38 may also include a drive bezel (not shown) positioned in front or forward of drive door 48 for covering and protecting the forward end of drive 10, and having a generally rectangular shaped opening adjacent drive door 48 to provide data cartridge load port (not shown) through which the data cartridge may be inserted and removed. Drive door 48 covers the data cartridge load port when door 48 is in a closed position, as is shown in FIG. 1. Drive door 48 also has an upper edge 50 and a lower edge 52. Drive door 48 includes a hinge 56 along upper edge 50 with outwardly extending pivot pins 60 and 64 at each end thereof.

Figure 2:
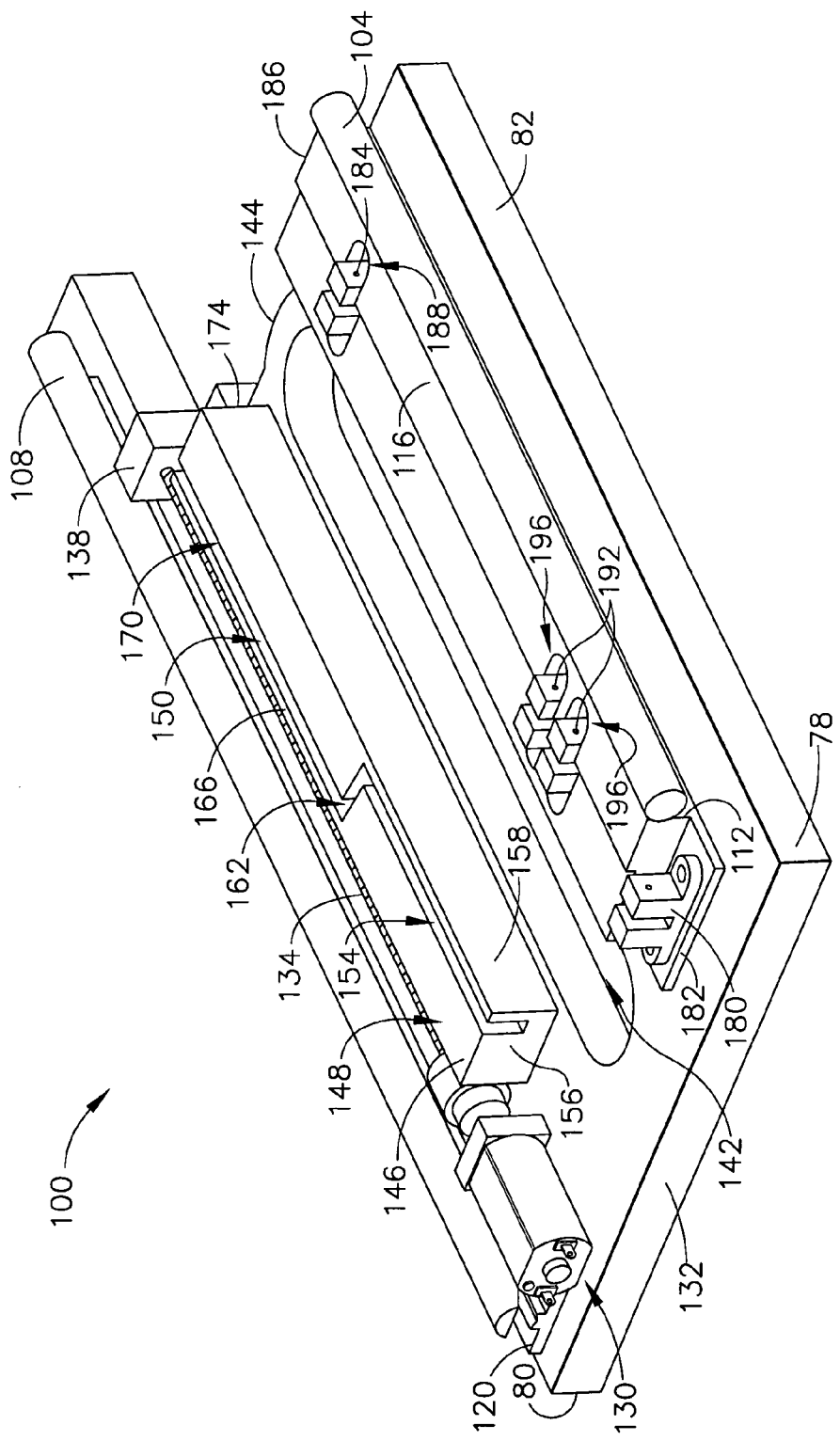
FIG. 2 is a top perspective view of the data drive of FIG. 1 with components removed to show the drive base assembly of the data drive.

Data drive 10 further comprises a pair of laterally spaced apart cartridge guide members that may be in the form of generally rectangular-shaped carrier guide panels 68 and 72. Pins 60 and 64 are shown, for example, in FIG. 1 as being pivotally mounted at or proximate respective upper corners 74 and 76, as well as at or proximate the leading or forward edges or ends, of guide panels 68 and 72. Drive door 48 may pivot upwardly towards an opened position to uncover the data cartridge load port (not shown), or downwardly towards a closed position to cover the data cartridge load port, about the axis defined by hinge 56 and pins 60 and 64 mounting door 48 on guide panels 68 and 72. Although not shown, a biasing or urging member such as a torsion spring may be provided which biases or urges the drive door 48 to pivot downwardly towards the closed position. As also shown in FIG. 1, panels 68 and 72 may be mounted on or otherwise attached at respective side edges 78 and 80 of base plate 82 and extend generally upwardly therefrom Referring to FIG. 2, data drive 10 further includes a drive base assembly indicated generally as 100 that includes base plate 82. Drive base assembly 100 may include a pair of laterally spaced apart and generally parallel elongated sled rails or guides indicated as 104 and 108 that are proximate and extend generally parallel to respective side edges 78 and 80 of base plate 82. As shown in FIG. 2, sled guide 104 is generally cylindrical in shape, while sled guide 108 is generally semi-cylindrical in shape. Sled guide 104 may be mounted on or integral with the outer side 112 of elongated mounting bracket 116 that may be attached to, integral with or otherwise secured to base plate 82, while sled guide 108 may be mounted on or integral with elongated mounting bracket 120 that may be attached to, integral with or otherwise secured to base plate 82.

Drive base assembly 100 may further include a drive motor assembly comprising a motor and gear drive assembly, indicated generally as 130, that may be mounted on or otherwise attached to the leading or forward end 132 of base plate 82 adjacent to or proximate sled guide 108. Assembly 130 causes the reciprocal and reversible rotation of a lateral movement transfer member that may be in the form of rotatable elongated lead screw 134. Lead screw 134 may be received at its distal and opposite end from assembly 130 by a bearing block 138 mounted on or otherwise attached to base plate 82. An elongated generally oval-shaped spindle drive assembly slot 142 may be formed in base plate 82 and extends from proximate forward end 132 to proximate trailing or rearward end 144 of base plate 82, and may be approximately equidistant between side edges 78 and 80.

Also shown in FIG. 2 is an elongated and generally block-shaped shutter actuator arm cam pin guide member 146 that may be mounted on or otherwise attached to base plate 82 between slot 142 and lead screw 134. Guide member 146 may have formed in upper section 148 thereof an elongated shutter actuator arm cam pin guide slot 150. As shown in FIG. 2, slot 150 may be generally S-shaped and elongated along the longitudinal axis of guide member 146 with a leading or forward elongated longitudinal slot segment 154 extending from forward end 156 of guide member 146 along and proximate inner side or edge 158 thereof, a shorter intermediate slot segment 162 extending transversely from proximate inner edge 158 at the rearward end of forward slot segment 154 to proximate outer side or edge 166 of guide member 146, and a trailing or rearward elongated longitudinal slot segment 170 extending from transversely from the rearward end of intermediate slot segment 162 along and proximate outer edge 166 to rearward end 174 of guide member 146. As shown in FIG. 2, connecting intermediate slot segment 162 may be generally or substantially perpendicular to forward and rearward longitudinal slot segments 154 and 170.

As also shown in FIG. 2, drive base assembly 100 may further include a leading or forward optical interrupt sensor 180 that may be mounted on or otherwise attached to base plate 82 at the leading or forward end 182 of mounting bracket 116, a trailing or rearward optical interrupt sensor 184 that may be mounted on or otherwise attached to base plate 82 at the trailing or rearward end 186 of mounting bracket 116 and extending upwardly through an aperture 188 formed therein, and a pair of relatively closely spaced intermediate optical interrupt sensors indicated as 192 that may be mounted on or otherwise attached to base plate 82 between forward and rearward sensors 180 and 184 and extending upwardly through apertures indicated as 196 formed in bracket 116. Sensors 180, 184 and 192 may be used to help or assist a linear encoder (not shown) to determine the lateral position of the carrier sled (to be described below).

Figure 3:
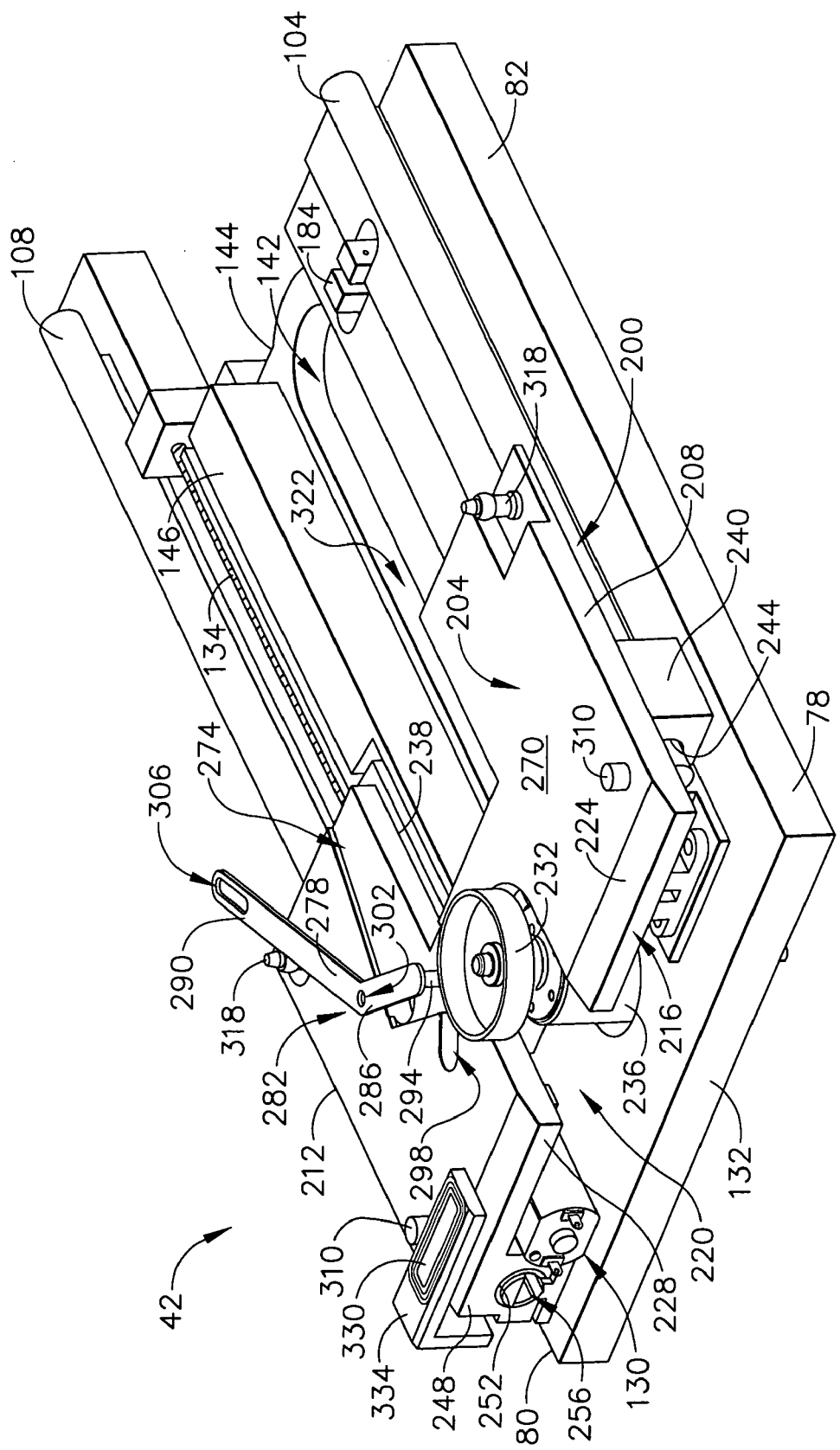
FIG. 3 is a top perspective view of the data drive of FIG. 2, but additionally showing the carrier sled and a portion of the cartridge shutter opening mechanism.

Referring to FIG. 3, cartridge loader/unloader mechanism 42 further comprises a laterally movable carrier transporter that may be in the form of a carrier sled, indicated generally as 200, that includes a carrier sled platform 204. Platform 204 has laterally spaced apart and generally parallel side edges 208 and 212, a leading or forward edge 216 that may have formed therein a generally U-shaped recess 220 opening forwardly and a pair of flanking and upwardly slanting cartridge lead in ramps 224 and 228 that may be on either side of the forward end of recess 220. As shown in FIG. 3, recess 220 receives the combination of a data cartridge coupler in the form of a drive spindle 232 and a spindle drive motor assembly, indicated generally as 236, that actuates, rotates or otherwise drives spindle 232. Recess 220 may be configured to receive and engage drive spindle 232 so as to cause the combination of drive spindle 232 and spindle drive motor assembly 236 to move laterally forward as carrier sled 200 moves laterally forward.

Figure 4:
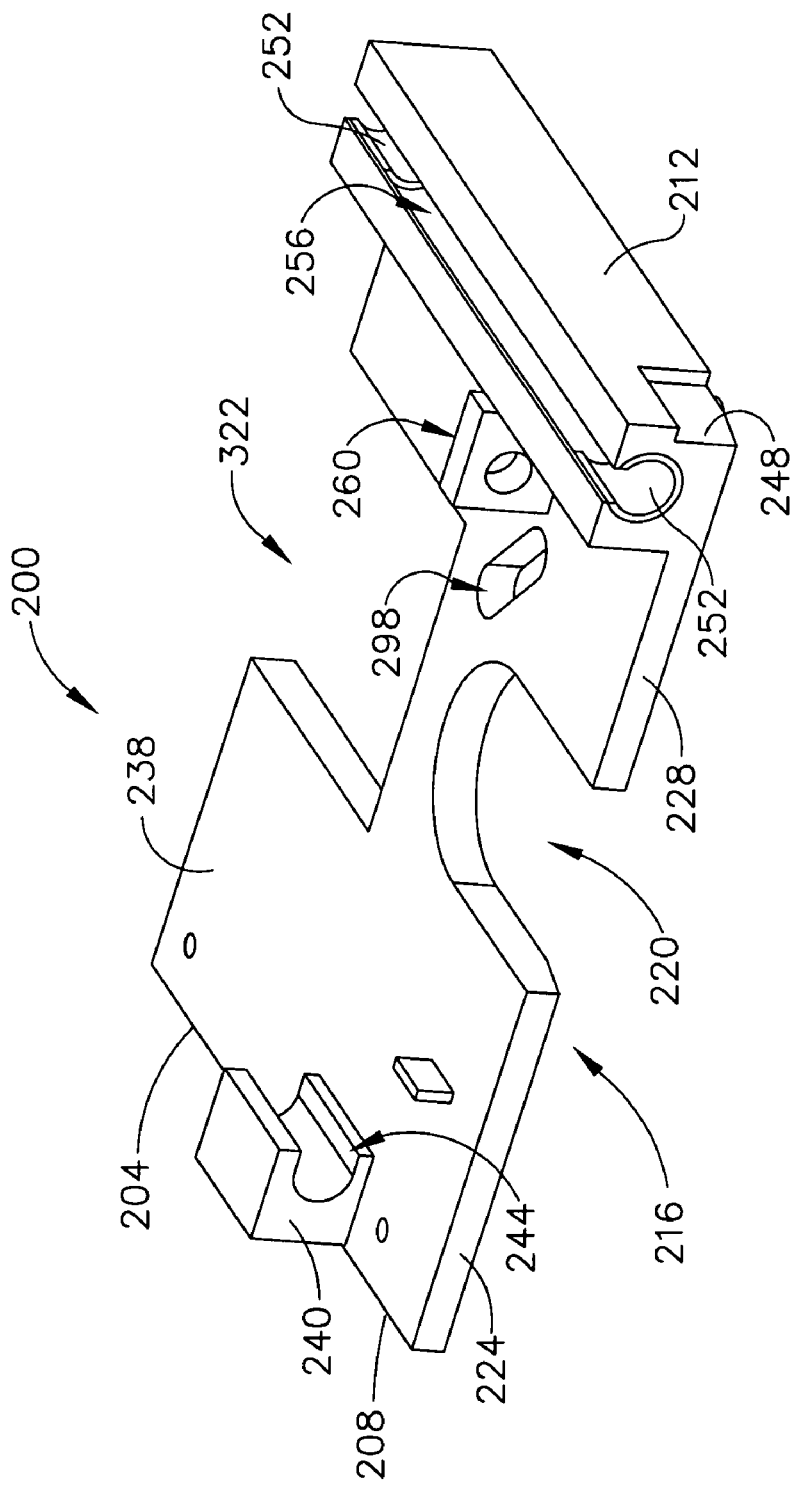
FIG. 4 is a bottom perspective view showing the underside of the carrier sled of FIG. 3.

Referring to FIGS. 3 and 4, platform 204 may include an anti-rotational bushing 240 that may be attached to or integral with the underside 238 of platform 204 and may be positioned proximate to side edge 208. Bushing 240 may have a generally U-shaped recess 244 that faces inwardly to slidably receive sled guide 104 and to keep carrier sled 200 from rotating during lateral movement thereof forwards and/or rearwards. Platform 204 may also include a sled mounting bracket indicated as 248 that that may be attached to or integral with the underside 238 of platform 204 and may be positioned at or proximate to side edge 212. Sled mounting bracket 248 may have a generally U-shaped recess 252 that faces downwardly towards base plate 82 and may receive one or more generally cylindrical sled bushings, two of which are shown and indicated in FIG. 4 as 256, that slidably receive sled guide 108 to guide the lateral movement of carrier sled 200 forwards and/or backwards. (The arrangement of bushing 240/guide 104 and bracket 248/bushings 256/guide 108 may also be reversed.) As shown in FIG. 4, a transfer movement responsive member in the form of lead screw nut 260 may also be mounted on, attached to or otherwise associated with the underside 238 of platform 204. Lead screw nut 260 receives lead screw 134 so as to cause or impart lateral movement to carrier sled 200 forwards and/or backwards in response to the rotation or movement of lead screw 134.

As further shown in FIG. 3, the upper side or surface 270 of platform 204 may have formed therein a shutter actuator arm recess 274 for cooperating with a shutter actuator arm 278. Arm 278 may be bent or kinked at elbow 282 to provide a shorter leading shutter actuator arm cam pin segment 286 and a longer trailing cartridge shutter cam slot segment 290. Shutter actuator arm 278 may have a shutter actuator arm cam pin, indicated as 294, that extends downwardly from the forward end of segment 286 and through a carrier sled cam pin slot, indicated as 298, that may be formed in platform 204 so that pin 294 may be received, move within and be guided by shutter actuator arm cam pin guide slot 150 of guide member 146. A hole may be formed in shutter actuator arm 278 at or proximate elbow 282 to receive a pivot pin (see FIG. 6) from the underside of the cartridge carrier, as described below, to define a pivot point, indicated as 302. A shutter arm cam slot 306 is also formed at the rearward end of segment 290 that receives a cartridge shutter cam slot pin from the cartridge carrier, as described below.

As shown in FIG. 3, two cartridge carrier guide pins 310 may be provided and mounted on upper surface 270 proximate the leading edge 216 of platform 204 and rearward of respective cartridge carrier lead ramps 224 and 228, and proximate respective side edges 208 and 212. Cartridge carrier guide pins 310 locate and guide the cartridge carrier during vertical movement towards or away from drive spindle 232, as described below. As also shown in FIG. 3, cartridge carrier guide posts indicated as 318 may also be provided that are mounted on platform 204, and may extend or protrude upwardly therefrom proximate the rearward or trailing edge 322 of platform 204 and proximate respective side edges 208 and 212. Guide posts 318 engage corresponding holes in the cartridge carrier to cause the carrier to move laterally forward and/or rearward, as well as to locate and guide the cartridge carrier during vertical movement towards or away from drive spindle 232, as described below. An RFID antenna, indicated generally as 330, may also provided and may be mounted on leading edge 216 of platform 204 proximate edge 212 by generally L-shaped mounting bracket 334.

Figure 5:
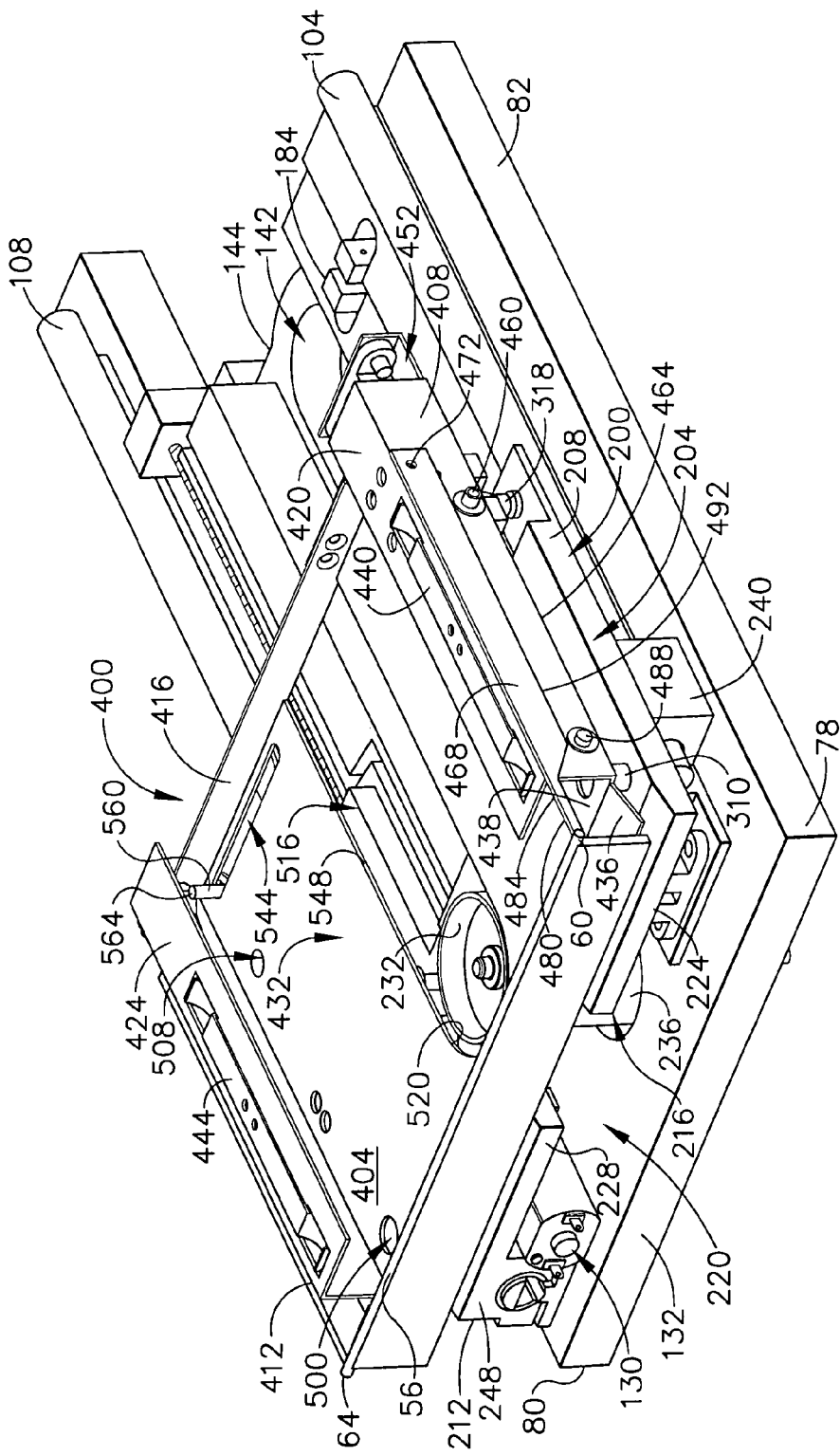
FIG. 5 is a top perspective view of the data drive of FIG. 3, but additionally showing the cartridge carrier and related components.
Figure 6:
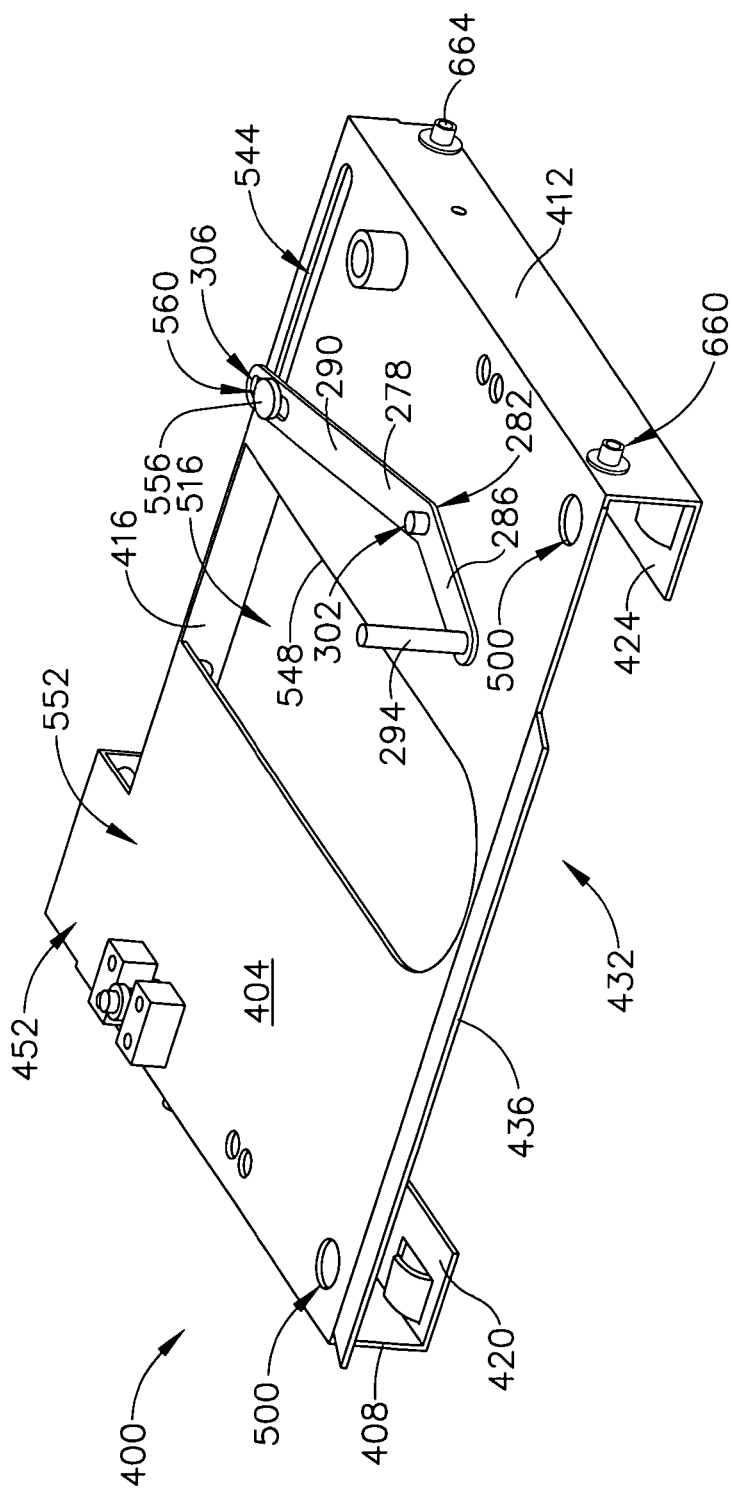
FIG. 6 is a bottom perspective view of the underside of the cartridge carrier shown in FIG. 5.

Referring to FIGS. 5 and 6, cartridge loader/unloader mechanism 42 includes a cartridge carrier, indicated generally as 400, that moves laterally forward or towards drive door assembly 38/drive door 48 to the unloading or ejecting position for mechanism 42, or laterally rearward or away from drive door assembly 38/drive door 48 to the loading position for mechanism 42, as described below. Cartridge carrier 400 may comprise a generally square-shaped bottom portion, indicated generally as 404, a pair of laterally spaced apart generally rectangular-shaped sides 408 and 412 extending generally upwardly and transversely from respective side edges of bottom portion 404, a generally rectangular-shaped rear portion 416 connected to and extending generally upwardly and transversely from the back or rear edge of bottom portion 404, and a pair of laterally spaced apart upper guide portions 420 and 424 connected to the respective upper edges of sides 412 and 416 and extending generally inwardly towards each other. The data cartridge may be received by cartridge carrier 400 through a cartridge load opening 432 defined by bottom portion 404, sides 408 and 412 and upper guide portions 420 and 424. An upwardly slanting cartridge lead in ramp 436 may also be provided at the leading or forward edge 438 of carrier 400 to guide the data cartridge through opening 432.

When fully received within opening 432, the data cartridge may be held securely but releasably within cartridge carrier 400 by a pair of leaf springs indicated as 440 and 444 that may be attached to upper guide portions 420 and 424, and thus bias or urge the data cartridge downwardly against bottom portion 404. As shown particularly in FIG. 5, a mounting section 452 may be provided proximate rearward portion 416 and side 408 of cartridge carrier 400 for a cartridge position switch, as described below. As also shown in FIG. 5, cartridge carrier 400 may have associated therewith a primary carrier cam member that may be in the form of primary carrier cam pin 460 that extends or protrudes outwardly from side 408 and may be positioned proximate lower side edge 464 joining or connecting side 408 to bottom portion 404, and towards rear portion 416. Primary carrier cam pin 460 may cooperate with a primary carrier guide cam slot formed in guide panel 68, as described below.

As further shown in FIG. 5, loader/unloader mechanism 42 further comprises an elongated drive door locking arm 468 that may be pivotally mounted at or proximate the trailing or rearward end thereof on the inside of guide panel 68, as indicated at pivot point 472. The leading or forward end of drive door locking arm 468 may comprise a drive door locking finger, indicated as 480, that extends forwardly from upper edge 484 of arm 468. Also shown in FIG. 4 is a locking arm cam pin, indicated as 488, which may be attached to side 408 proximate lower side edge 464 and forward edge 438, and which protrudes or extends outwardly from side 408.

When drive door 48 is in an opened position (not shown), cam pin 488 engages lower edge 492 of arm 468 and thus supports arm 468 so that arm 468 is unable pivot counterclockwise and downwardly about the axis defined by pivot point 472. When cartridge carrier 400 moves away from drive door 48, cam pin 488 also moves rearwardly along lower edge 492 until cam pin 488 reaches the rearward end of lower edge 492 and thus no longer supports arm 468. When cam pin 488 no longer supports arm 468, arm 468 may then pivot counterclockwise and downwardly about the axis defined by pivot point 472 so that locking finger 480 eventually engages lower edge 52 when drive door 48 is in a closed position. As a result of locking finger 480 engaging lower edge 52, drive door 48 is in a locked position and is thus prevented from accidentally pivoting counterclockwise and upwardly about the axis defined by hinge 56 and pins 60 and 64. Conversely, when cartridge carrier 400 moves towards drive door 48, locking arm cam pin 488 eventually engages lower edge 492, thus causing arm 468 to pivot clockwise and upwardly about the axis defined by pivot point 472. As a result, locking finger 480 also moves upwardly and no longer engages lower edge 52 so that drive door 48 may then pivot upwardly about the axis defined by hinge 56 and pins 60 and 64 to an opened position.

As also shown in FIGS. 5 and 6, bottom portion 404 may have a pair of carrier guide pin holes 500 formed therein proximate forward edge 438 and respective sides 408 and 412 to vertically receive respective carrier guide pins 310 mounted on platform 204 of carrier sled 200. Bottom portion 404 may also be provided with a pair of carrier guide post holes, one of which is shown and indicated as 508, and which may be formed in bottom portion 404 towards rear portion 416 and respective sides 408 and 412 to vertically receive respective carrier guide posts 318 mounted on platform 204 of carrier sled 200.

As further shown in FIGS. 5 and 6, bottom portion 404 of cartridge carrier 400 may have formed therein a generally U-shaped recess, indicated as 516, that may open rearwardly towards rear portion 416 and may correspond at least generally in shape and position to the lower disk medium aperture on the underside of the housing of the data cartridge when the cartridge is fully loaded within cartridge carrier 400. The forward generally semicircular portion 520 of recess 516 may be configured to receive and engage drive spindle 232 so as to cause the combination of drive spindle 232 and spindle drive motor assembly 236 to move laterally rearward as cartridge carrier 400 moves laterally rearward. Bottom portion 404 of cartridge carrier 400 may also have formed therein an elongated cartridge shutter cam pin slot, indicated as 544, that may extend inwardly from side 412 to almost side edge 548 of recess 516, and generally parallel to and proximate rear portion 416.

As shown particularly in FIG. 6, shutter actuator arm 278 is mounted for pivotal movement at pivot point 302 to the underside 552 of bottom portion 404 of cartridge carrier 400. As further shown in FIG. 6, shutter arm cam slot 306 at the rearward end of segment 290 is positioned proximate and underneath cartridge shutter cam pin slot 544. As particularly shown in FIG. 6, head 556 is at one end of cartridge shutter cam pin 560 that protrudes or extends upwardly through shutter arm cam slot 306. Pin 560 also extends upwardly through and is received by slot 544 such that pin is movable within slot 544. As further shown in FIGS. 5 and 1, cartridge shutter cam slot actuating end 564 of pin 560 extends above the bottom portion 404. As segment 290 moves inwardly, shutter arm cam slot 306 engages cartridge shutter cam slot pin 560, with pin 560 moving inwardly within cartridge shutter cam pin slot 544, and away from side 412 of carrier 400 and towards side edge 548 of recess 516. Conversely, as segment 290 moves outwardly, shutter arm cam slot 306 engages pin 560 and causes cartridge shutter cam slot pin 560 to move outwardly within cartridge shutter cam pin slot 544, and towards side 412 and away from side edge 548 of recess 516. Pin 560 also moves within slot 306 which has a length that is sized to accommodate the arc path of segment 290 as it moves inwardly or outwardly.

Figure 7:
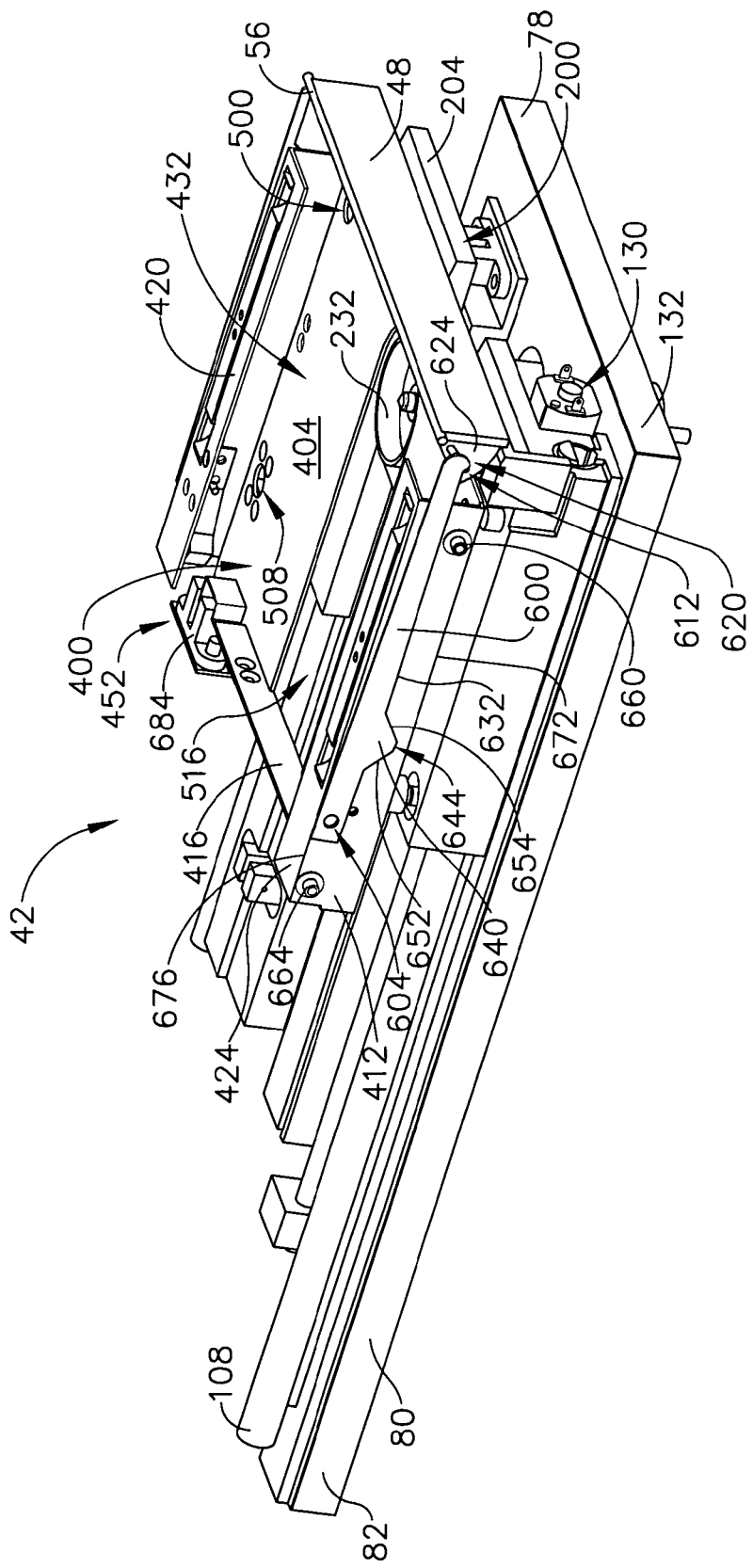
FIG. 7 is a bottom perspective view of a top perspective view of the data drive of FIG. 3 showing the other side of the cartridge carrier, carrier sled, drive base assembly and related components.

Referring to FIG. 7, loader/unloader mechanism 42 may further comprise an elongated drive door actuating arm 600. Door actuating arm 600 may be pivotally mounted at or proximate trailing or rearward end thereof on the inside of guide panel 72, as indicated at pivot point 604. At the leading or forward end of arm 600 is a drive door actuating cam pin indicated by 612 that may extend or protrude inwardly to be received by and cooperate with a drive door actuating cam slot, indicated as 620, that may be formed in one end 624 of drive door 48. Formed in the lower edge 632 of arm 600 is a generally V-shaped door actuating arm cam portion 640 that may be positioned towards pivot point 604. The bottom point or corner of cam portion 640 (i.e., at the bottom of the V-shape) is indicated as 644 and may point downwardly towards base plate 82. Cam portion 640 further comprises a rearward cam edge 652 extending rearwardly and upwardly from corner 644 and a forward cam edge 654 extending forwardly and upwardly from corner 644.

As further shown in FIG. 7, a primary carrier cam member that may be in the form of primary carrier cam pin 660 and a secondary carrier cam member that may be in the form of secondary carrier cam pin 664 are provided that may be associated with side 412 of carrier 400 and extend or protrude outwardly therefrom. As also shown in FIG. 7, primary carrier cam pin 660 may be positioned towards and proximate the leading edge 438 of carrier 400, as well as lower side edge 672 joining or connecting bottom portion 404 and side 412, while secondary carrier cam pin 664 may be positioned toward and proximate rear portion 416 of carrier 400, as well as upper side edge 676 joining or connecting upper guide portion 424 and side 412. Also shown in FIG. 7 is a cartridge position switch, indicated generally as 684, that may be mounted in mounting section 452 of cartridge carrier 400 for sensing when the data cartridge is fully inserted within opening 432.

During lateral movement of cartridge carrier 400, carrier cam portion 640 of drive door actuating arm 600 may cooperate with and be engaged by primary carrier cam pin 660, i.e., cam pin 660 may also function as drive door arm actuating cam pin for arm 600. As carrier 400 moves forwardly towards drive door 48 (i.e., towards an unloading position), primary carrier cam pin 660 engages and moves along the rearward cam edge 652 of cam portion 640, thus causing arm 600 to pivot counterclockwise and upwardly about the axis defined by pivot point 604. Similarly, as carrier 400 moves away from drive door 48 (i.e., towards an loading position), primary carrier cam pin 660 engages and moves along forward cam edge 654 of cam portion 640, thus also causing arm 600 to pivot counterclockwise and upwardly about the axis defined by pivot point 604. As arm 600 pivots upwardly and counterclockwise (i.e., due to primary carrier cam pin 660 engaging rearward cam edge 652 when moving towards drive door 48, or forward cam edge 654 of cam portion 640 when moving away from drive door 48), drive door actuating cam pin 612 engages drive door actuating cam slot 620, thus causing drive door 48 to pivot upwardly and clockwise (relative to drive door end 624) about the axis defined by hinge 56 and pivot pins 60 and 64 to an opened position. Conversely, as arm 600 pivots clockwise and downwardly (i.e., due to primary carrier cam pin 660 moving past corner 644 and along rearward cam edge 652 as carrier 400 moves away from drive door 48, or due to primary cam pin 660 moving past corner 644 and along forward cam edge 654 as carrier 400 moves towards drive door 48), drive door 48 is no longer supported in an opened position by arm 600, and thus pivots downwardly and counterclockwise (relative to drive door end 624) about the axis defined by hinge 56 and pivot pins 60 and 64 to a closed position.

Referring to FIG. 1, guide panel 68 may have formed therein a generally S-shaped primary carrier guide cam slot, indicated generally as 700, that may be elongated along the longitudinal axis of guide panel 68. Primary cam slot 700 may comprise a leading or forward longitudinal slot segment 704 extending generally horizontally along a longitudinal axis proximate the middle or intermediate section of guide panel 68, an intermediate slot segment 708 extending and slanting downwardly from the rearward end of forward slot segment 704, and a trailing or rearward longitudinal slot segment 712 extending generally horizontally along a longitudinal axis below the longitudinal axis of the forward slot segment 704 from the rearward end of intermediate slot segment 708 to proximate the vertically extending trailing or rearward edge 720 of guide panel 68. As shown in FIG. 1, primary carrier cam pin 460 may be received by cam slot 700 and may be movable therein along the entire length thereof between the front end 724 of forward slot segment 704 and the rearward end 728 of rearward slot segment 712. As primary carrier cam pin 460 moves rearwardly and downwardly along intermediate slot segment 708, cartridge carrier 400 moves downwardly and towards drive spindle 232 so that the data cartridge is eventually coupled to and engaged thereby. Conversely, as carrier cam pin 460 moves forwardly and upwardly along intermediate slot segment 708, cartridge carrier 400 moves upwardly and away from drive spindle 232 so that the data cartridge is eventually uncoupled therefrom.

Figure 8:
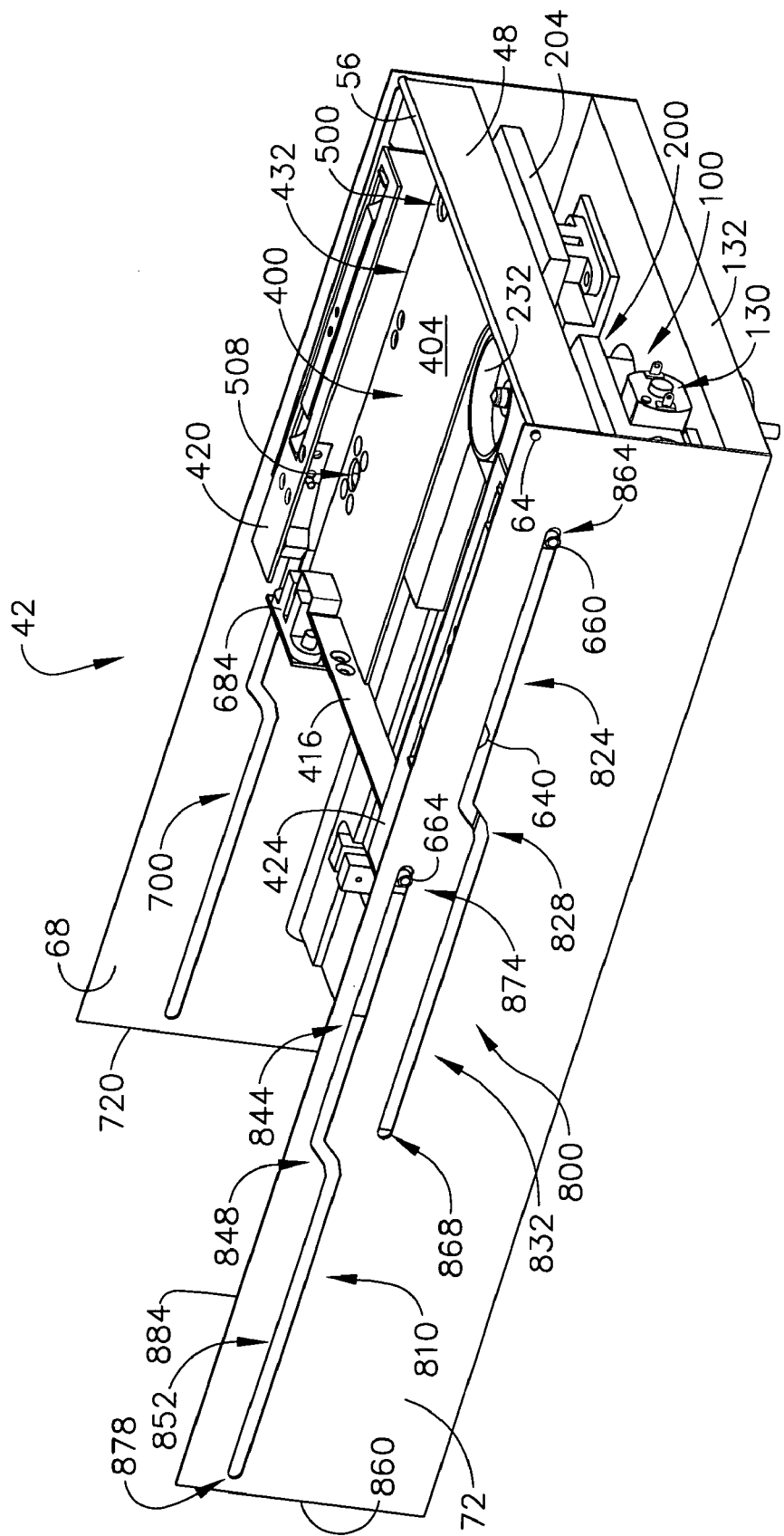
FIG. 8 is a bottom perspective view of the data drive and data cartridge loading and unloading mechanism of FIG. 1.

Referring to FIG. 8, guide panel 72 may have formed therein a generally S-shaped leading or forward primary carrier guide cam slot, indicated generally as 800, as well as an elongated and similar configured generally S-shaped trailing or rearward secondary carrier guide cam slot, indicated generally as 810. Primary and secondary cam slots 800 and 810 may each be elongated along the longitudinal axis of panel 72. Primary cam slot 800 may comprise a leading or forward longitudinal slot segment 824 extending generally horizontally along a longitudinal axis proximate the forward section of guide panel 72, an intermediate transverse and shorter slot segment 828 extending and slanting downwardly from the rearward end of forward slot segment 824, and a trailing or rearward longitudinal slot segment 832 extending generally horizontally along a longitudinal axis below the longitudinal axis of the forward slot segment 824 from the rearward end of intermediate slot segment 828 to slightly past the middle or intermediate section of guide panel 72. Secondary cam slot 810 may comprise a leading or forward longitudinal slot segment 844 extending generally horizontally along a longitudinal axis proximate the middle or intermediate section of guide panel 72, an intermediate transverse and shorter slot segment 848 extending and slanting downwardly from the rearward end of forward slot segment 844, and a trailing or rearward longitudinal slot segment 852 extending generally horizontally along a longitudinal axis below the longitudinal axis of the forward slot segment 844 from the rearward end of intermediate slot segment 848 to proximate the vertically extending trailing or rearward edge 860 of guide panel 72.

As also shown in FIG. 8, primary carrier cam pin 660 may be received by primary cam slot 800 and may be movable therein along the entire length thereof between the front end 864 of forward slot segment 824 and the rearward end 868 of rearward slot segment 832, while secondary carrier cam pin 664 may be received by secondary cam slot 810 and may be movable therein along the entire length thereof between the front end 874 of forward slot segment 844 and the rearward end 878 of rearward slot segment 852. As primary (or secondary) carrier cam pin 660 (or 664) moves rearwardly and downwardly along intermediate slot segment 828 (or 848), cartridge carrier 400 moves downwardly and towards drive spindle 232 so that the data cartridge is eventually coupled to and engaged thereby. Conversely, as primary (or secondary) carrier cam pin 660 (or 664) moves forwardly and upwardly along intermediate slot segment 828 (or 848), cartridge carrier 400 moves upwardly and away from drive spindle 232 so that the data cartridge is eventually uncoupled therefrom.

As further shown in FIG. 8, secondary cam slot 810 may be proximate upper edge 884 of guide panel 72, while primary cam slot 800 may be offset or staggered laterally (horizontally) and vertically relative to secondary cam slot 810, such that primary cam slot 800 is generally below and forward (see forward slot segment 824) of secondary cam slot 810 (see forward slot segment 844), with forward slot segment 844 of secondary cam slot 810 being positioned vertically above and over rearward slot segment 832 of primary cam slot 800. As also shown in FIG. 1 and FIG. 8, primary cam slot 700 and secondary cam slot 810 may be positioned laterally (horizontally) approximately the same or similar relative to each other (see, for example, forward slot segment 704 and forward slot segment 844), but with primary cam slot 700 being positioned vertically below secondary cam slot 810. As also shown by FIGS. 1 and 8, primary cam slot 800 may be offset or staggered laterally (horizontally) and vertically relative to primary cam slot 700, such that primary cam slot 800 is generally below and forward of primary cam slot 700 (see, for example, forward slot segment 704 and forward slot segment 824) with forward slot segment 704 being positioned above and laterally (horizontally) approximately the same or similar relative to rearward slot segment 832, with forward slot segment 844 of secondary cam slot 810 being positioned vertically above and laterally (horizontally) approximately the same or similar relative to forward slot segment 704 of primary cam slot 700.

Figure 9:
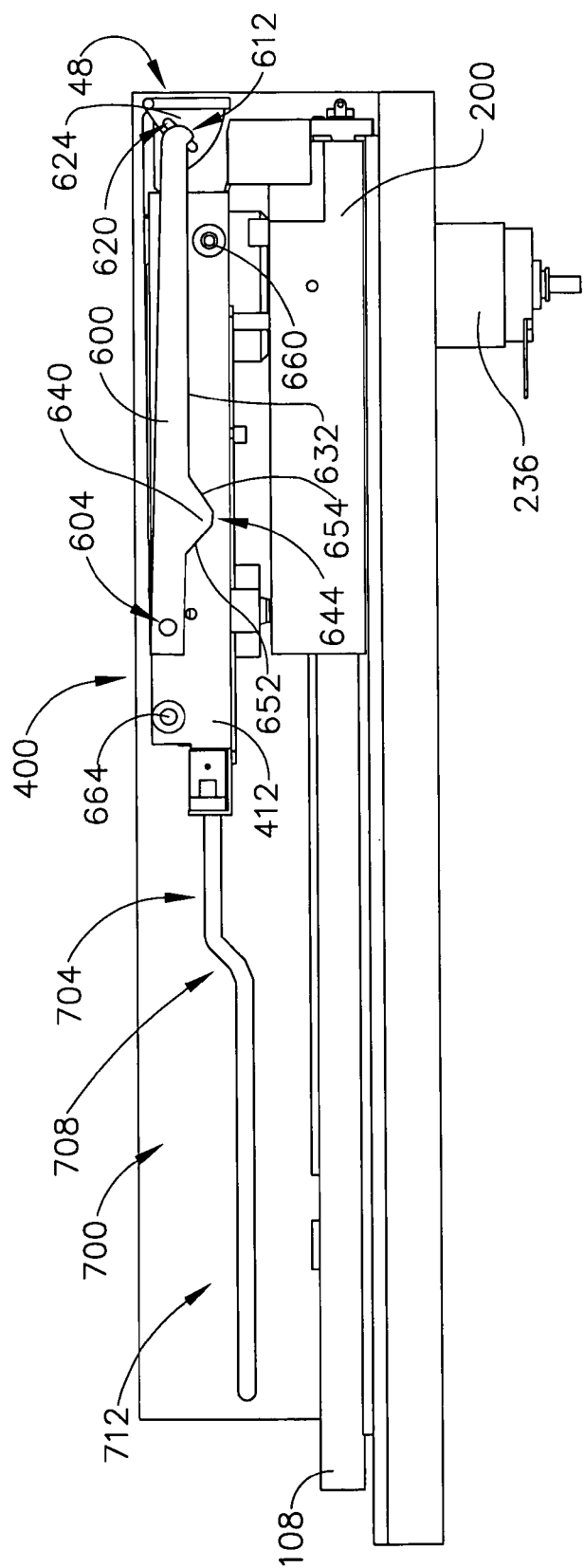
FIGS. 9 through 14 are side views illustrating the sequential operation of the data drive, as well as the cartridge unloading and loading mechanism, starting from a cartridge unloaded position and ending with a cartridge loaded position.
Figure 10:
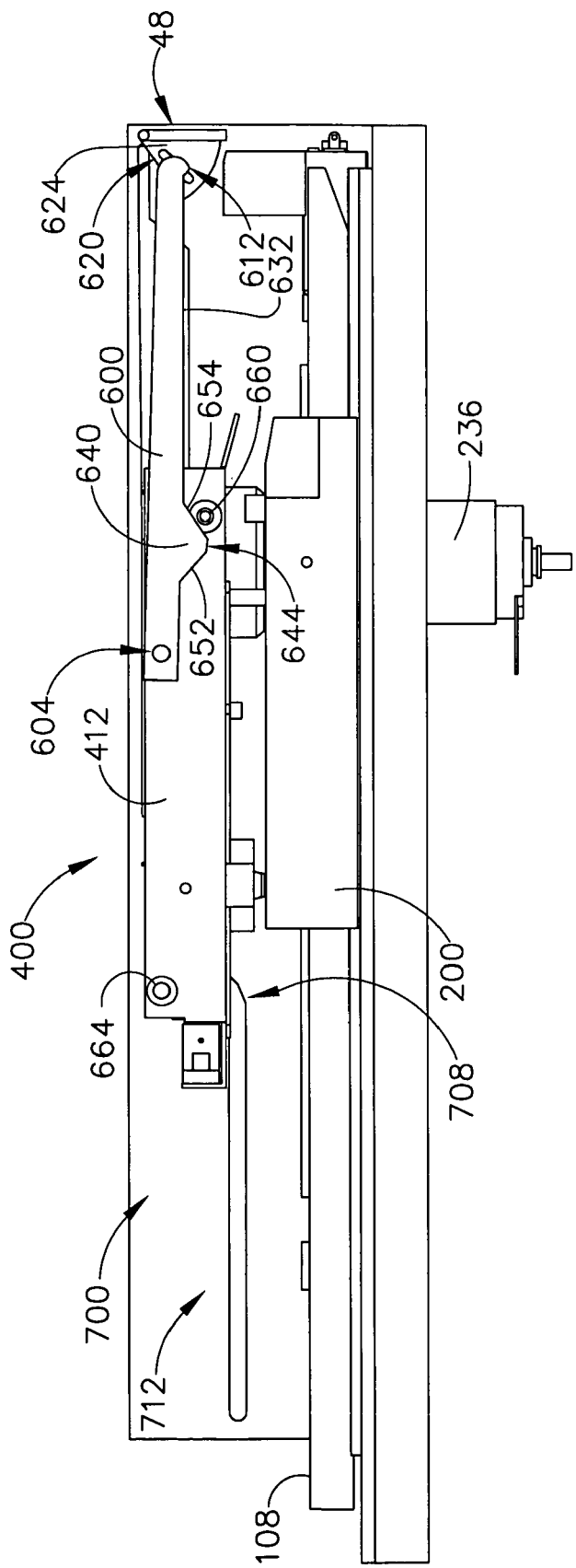

In operation, data drive 10 is shown in FIG. 9 in a "ready" or "cartridge loading" position for opening drive door 48 so that a data cartridge may then be loaded within cartridge carrier 400. To open drive door 48, motor and gear drive assembly 130 may be activated to cause rotation of lead screw 134 such that it causes or imparts movement to lead screw nut 260 rearwardly and away from drive door 48. As lead screw nut 260 moves rearwardly away from drive door 48, carrier sled 200 moves rearwardly (see FIG. 10) on sled guides 104 and 108, along with the combination of drive spindle 232 and spindle drive motor assembly 236 engaged by the semicircular portion of 520 of recess 516 of platform 204. As carrier sled 200 moves rearwardly, cam pins 460, 660 and 664 begin to move rearwardly within forward longitudinal slot segments 704, 824 and 844 of respective primary cam slot 700, primary cam slot 800 and secondary cam slot 810.

Figure 11:
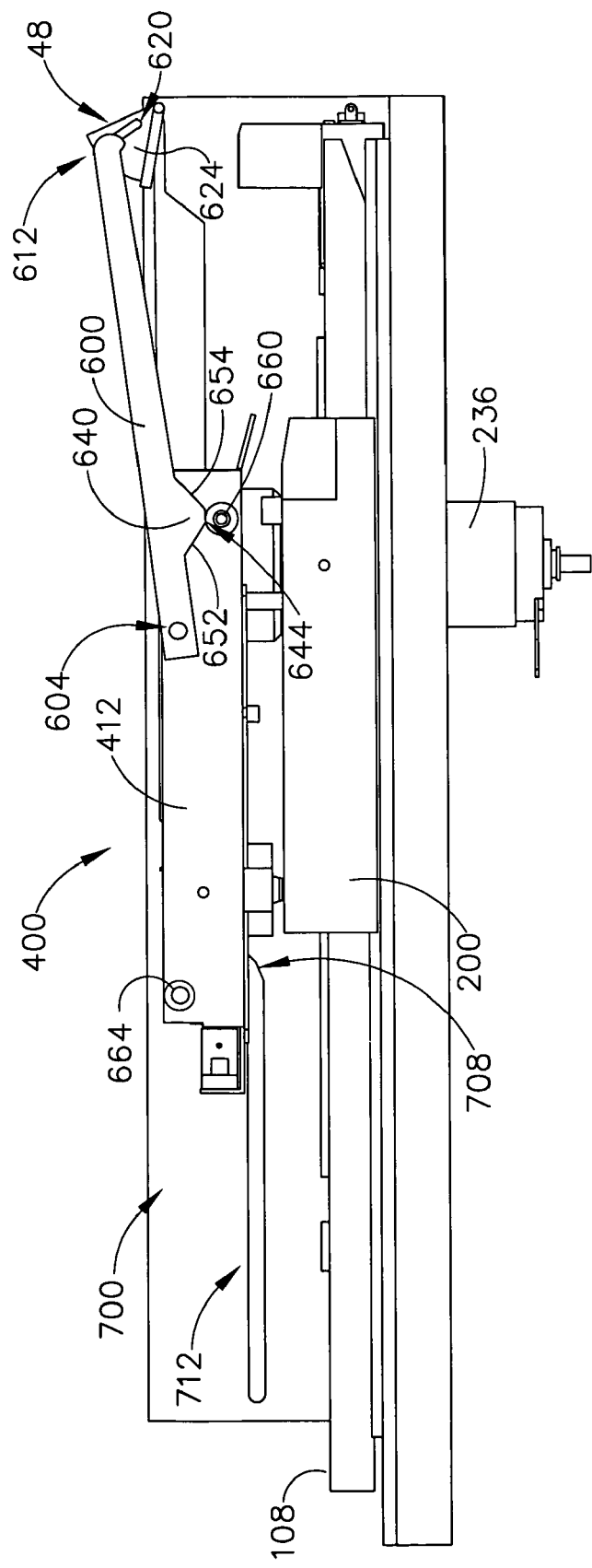

As cartridge carrier 400 reaches the door opening position shown in FIG. 11, drive door actuator arm 600 moves upwardly about the axis defined by pivot point 604 in response to cam pin 660 engaging the forward cam edge 654 of cam portion 640. As arm 600 continues to move upwardly, drive door opening cam pin 612 engages drive door opening cam slot 620, thus causing drive door 48 to pivot upwardly about the axis defined by hinge 56 and pivot pins 60 and 64 and to an opened position. When drive door 48 has reached a fully opened position, the data cartridge may then be inserted into data drive 10, for example, through the data cartridge load port (not shown) of drive door assembly 38. The inserted data cartridge may then be received through the load opening 432 of cartridge carrier 400 and may be held securely therein by leaf springs 440 and 444. End 564 of cartridge shutter cam pin 560 may also engage a cam slot formed in the housing of the data cartridge for opening the cartridge shutter.

Figure 12:
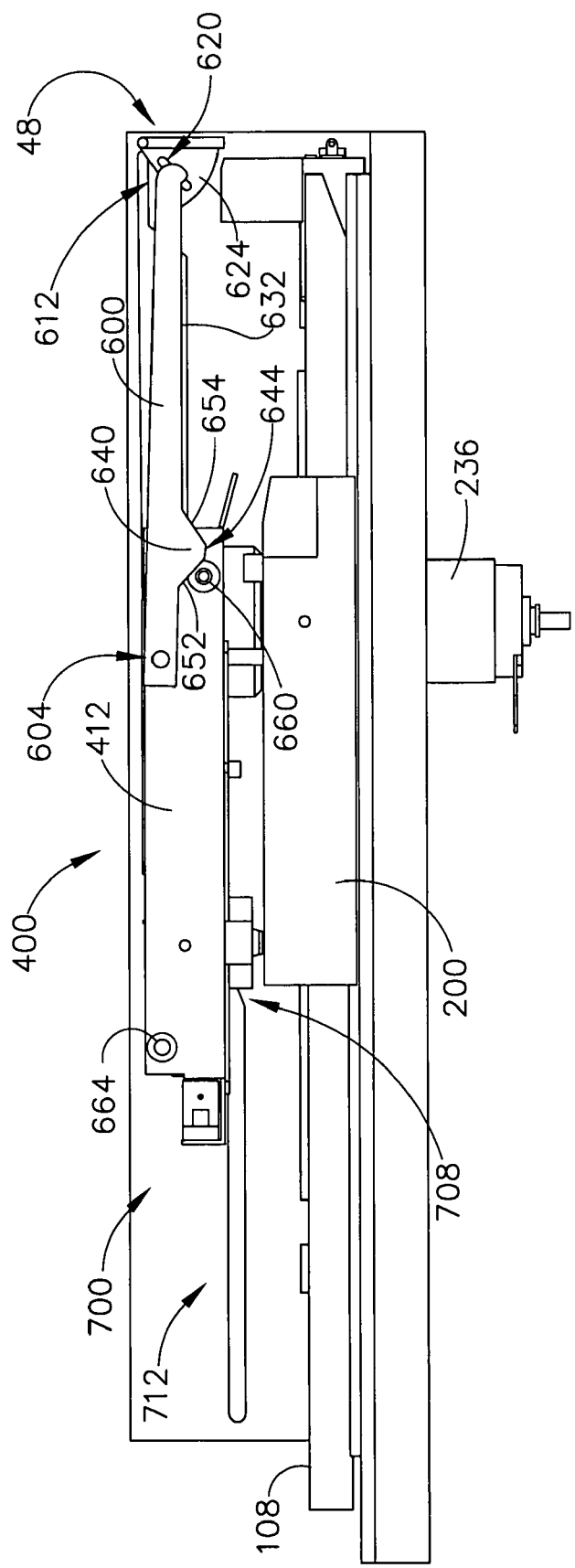

When the data cartridge is detected as being fully inserted within cartridge carrier 400 by cartridge position switch 684, motor and gear drive assembly 130 is again activated to cause further rotation of lead screw 134, thus causing further rearward movement of carrier sled 200 away from drive door 48. Eventually and as shown in FIG. 12, cam pin 660 moves past bottom corner 644 of cam portion 640 and then along rearward cam edge 652. As a result, arm 600 pivots downwardly about pivot point 604. This downward movement of arm 600 causes the door actuating cam pin 612 to engage door actuating cam slot 620 such drive door 48 that pivots downwardly about the axis defined by hinge 56 and pivot pins 60 and 64 and to a closed position.

At the same time that arm 600 moves downwardly to actuate drive door 48 to a closed position, locking arm cam pin 488 eventually moves past the rearward end of lower edge 492 so that cam pin 488 no longer supports drive door locking arm 468. As a result, arm 468 may then pivot counterclockwise and downwardly about the axis defined by pivot point 472. When arm 468 pivots completely downward, door locking finger 480 engages bottom edge 52. With bottom edge 52 engaged by locking finger 480, drive door 48 is in a locked position and cannot accidentally or unintentionally be opened while the shutter of the data cartridge is in an opened position.

Figure 13:
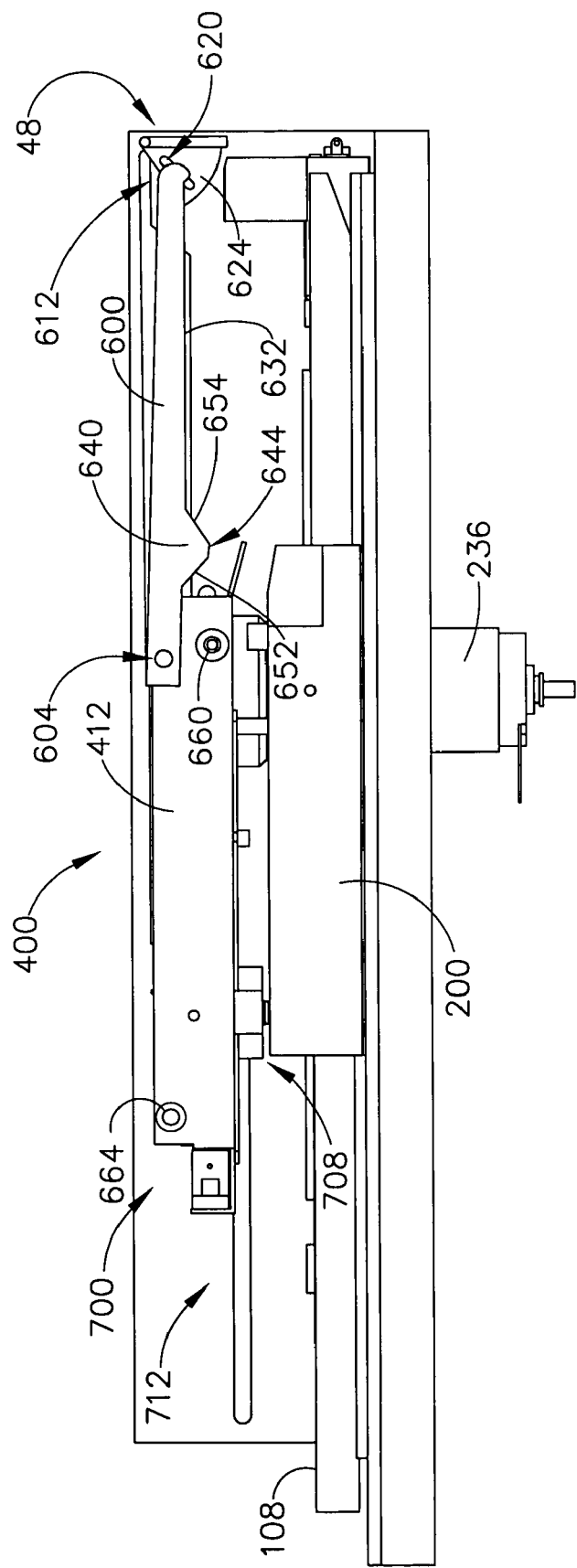

Referring to FIG. 13, carrier sled 200 may continue to move rearwardly and away from drive door 48, along with drive spindle 232 and spindle drive motor assembly 236 and carrier 400. With drive door 48 now in a closed position, the shutter of the data cartridge is ready to be opened to partially expose the disk medium within the data cartridge. In response to the rearward lateral movement of carrier sled 200, shutter actuator arm cam pin 294 of shutter actuator arm 278 also moves rearwardly within and is guided by forward slot segment 154 of shutter actuator arm cam pin guide slot 150. Eventually, pin 294 reaches and enters intermediate slot segment 162. As pin 294 moves outwardly within intermediate slot segment 162 towards outer side edge 166, this causes shutter actuator arm 278 to pivot clockwise about pivot axis 302 such that cartridge shutter cam slot segment 290 moves inwardly. As shutter actuator arm 278 continues to pivot clockwise and cam slot segment 290 moves inwardly, shutter arm cam slot 306 engages cartridge shutter cam slot pin 560. As a result, cartridge shutter cam slot pin 560 moves inwardly within cartridge shutter cam pin slot 544 away from side 412 of carrier 400 and towards side edge 548 of recess 516. As pin 560 moves inwardly within slot 544, end 564 of pin 560 engages a cam slot formed in the housing of the data cartridge such that the shutter of the cartridge is actuated to an opened position.

Figure 14:
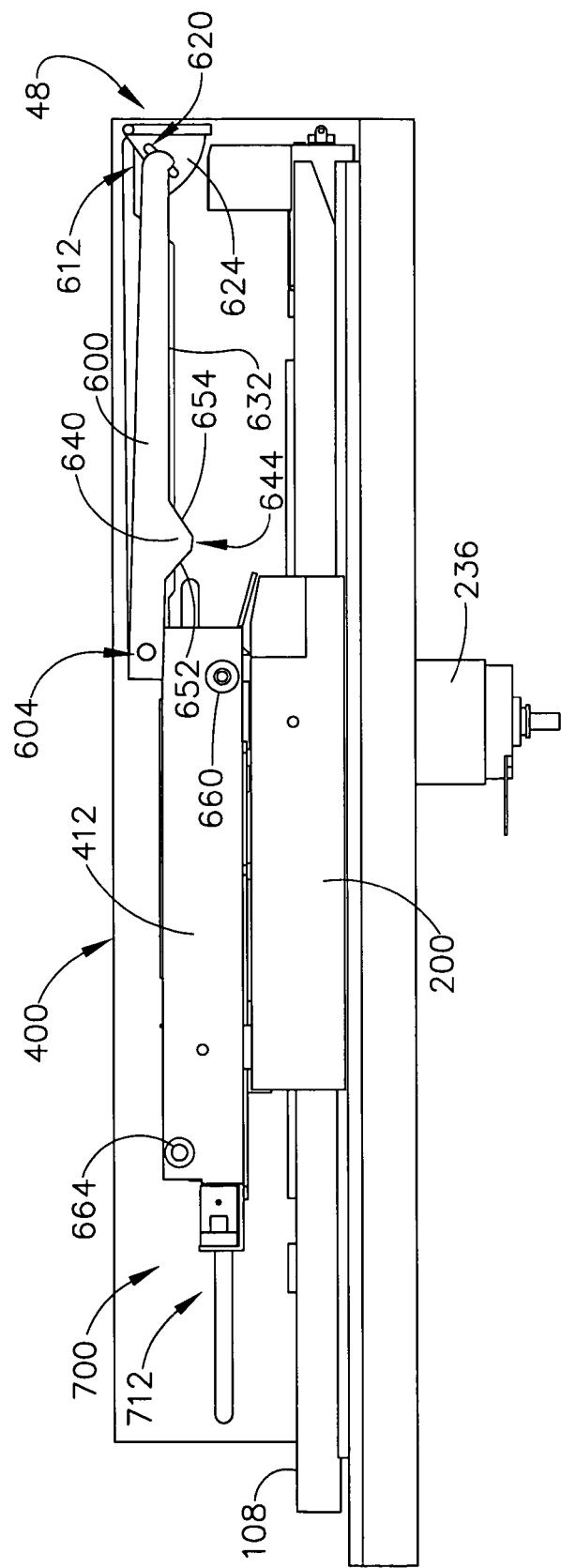

Referring now to FIG. 14, as carrier sled 200 continues to move rearwardly away from drive door 48 that is now in a fully closed position, cam pins 460, 660 and 664 reach and enter respective intermediate slot segments 708, 828 and 848 of respective primary cam slot 700, primary cam slot 800 and secondary cam slot 810. Cam pins 460, 660 and 664 may then move downwardly within respective intermediate slot segments 708, 828 and 848, thus causing carrier 400 to move downwardly, as shown in FIG. 14, and towards drive spindle 232, along with the data cartridge held within carrier 400. Eventually, carrier 400 moves downwardly sufficiently such that the data cartridge is coupled to drive spindle 232. Once the data cartridge is in a fully loaded and coupled position, carrier sled 200 may optionally continue to move rearwardly until the data cartridge is in the appropriate position for reading/writing of data from to the exposed disk medium by a read/write head (not shown) of data drive 10.

To unload or eject the data cartridge, a similar reciprocal but reverse operation to unloading/ejecting the data cartridge may be carried out by data drive 10 (see FIGS. 9-14 in reverse order), starting with and similar to the loaded and coupled position shown in FIG. 14. Motor and gear drive assembly 130 may be activated to rotate lead screw 134 such that screw 134 causes or imparts lateral movement to lead screw nut 260 forwardly and towards drive door 48. Cam pins 460, 660 and 664 move forwardly within respective rearward longitudinal slot segments 712, 832 and 852 of respective primary cam slot 700, primary cam slot 800 and secondary cam slot 810, and then upwardly within respective intermediate slot segments 708, 828 and 848, thus causing carrier 400 to move upwardly and away from drive spindle 232, along with the data cartridge within carrier 400. Eventually (see FIG. 13), carrier 400 moves upwardly sufficiently such that the data cartridge is completely uncoupled from drive spindle 232.

As carrier sled 200 (see FIG. 13) continues to move forwardly, cam pins 460, 660 and 664 may then reach and enter respective forward longitudinal slot segments 724, 824 and 844 of respective primary cam slot 700, primary cam slot 800 and secondary cam slot 810. Eventually, as carrier 400 moves forwardly towards drive door 48 and reaches the position shown in FIG. 12, drive door actuating arm 600 may be actuated by cam pin 660 engaging and moving along the rearward cam edge 652 of cam portion 640, thus causing arm 600 to pivot counterclockwise and upwardly about the axis defined by pivot point 604. Eventually, drive door actuating cam pin 612 engages drive door actuating cam slot 620, thus causing drive door 48 to pivot upwardly and counterclockwise (relative to drive door end 624) about the axis defined by hinge 56 and pivot pins 60 and 64 and to an opened position. When drive door 48 is in a fully opened position, the data cartridge may be unloaded or ejected from carrier 400 and retrieved from data drive 10, as shown in FIG. 11.

Prior to the opening of drive door 48 by the actuation of arm 600, and in response to the forward movement of sled 200 towards drive door 48, shutter actuator arm cam pin 294 of shutter actuator arm 278 moves forwardly within and may be guided by rearward slot segment 170 of shutter actuator arm cam pin guide slot 150. Eventually, pin 294 reaches and enters intermediate slot segment 162 and moves inwardly therein towards inner side edge 158, thus causing shutter actuator arm 278 to pivot counterclockwise about pivot axis 302 such that cartridge shutter cam slot segment 290 moves outwardly. As shutter actuator arm 278 continues to pivot counterclockwise and cam slot segment 290 moves outwardly, shutter arm cam slot 306 engages cartridge shutter slot cam pin 560. As a result, cartridge shutter slot cam pin 560 moves outwardly within cartridge shutter cam pin slot 544 towards side 412 of carrier 400 and away from side edge 548 of recess 516. As pin 560 continues to move outwardly within slot 544, end 564 of pin 560 disengages from the cartridge cam slot formed in the housing of the data cartridge before drive door 48 is opened by the actuation of arm 600. When end 564 of pin 560 disengages from cartridge cam slot, the shutter of the cartridge has closed so that the disk medium within the cartridge is no longer exposed.

Also prior to the opening of drive door 48 by the actuation of arm 600, cam pin 660 eventually engages and moves along lower edge 492 of arm 600. As cam pin 660 continues to move forwardly along lower edge 492, arm 468 pivots upwardly and clockwise about the axis defined by pivot point 472. As a result, locking finger 480 also moves upwardly and no longer engages lower edge 52. With lower edge 52 no longer engaged by locking finger 48, that drive door 48 may then be pivoted upwardly about the axis defined by hinge 56 and pins 60 and 64 and to an opened position, as shown in FIG. 11.

It should be appreciated that the specific embodiment of the loader/unloader mechanism 42, and associated components of data drive 10, illustrated in FIGS. 1 through 14 are provided to illustrate the teachings of the present invention. Alterations or modification within the skill of the art of the specific embodiment of the loader/unloader mechanism 42, and associated components of data drive 10, illustrated in FIGS. 1 through 14 are considered within the scope of the present invention, so long as these alterations or modifications operate in a same or similar manner, function, etc. These modifications can include the use of a single element, component or mechanism (in place of a plurality of elements, components or mechanisms shown in FIGS. 1 through 14), the use of a plurality of elements, components or mechanisms (in place of a single of element, component or mechanism is shown in FIGS. 1 through 14), the changing of the order, orientation, position, etc., of any of the elements, components or mechanisms, the combining or integrating of any of the elements, components or mechanisms into a single or unified element, component or mechanism, or the ungrouping of an element, component or mechanism into a plurality of associated elements, components or mechanisms, etc. Carrier sled 200 with the loaded data cartridge may be moved rearwardly in data drive 10 to an appropriate position for reading/writing of data from or to disk medium of the data cartridge by a read/write head that is in a relatively fixed or stationary position, or alternatively sled 200 with the loaded data cartridge may be moved so as to cooperate with a moveable read/write head for reading/writing of data from or to disk medium 30.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A device comprising a data storage cartridge loading and unloading mechanism comprising:
    a cartridge carrier for releasably receiving a data cartridge and for moving the data cartridge towards or away from a data cartridge coupler and for moving the data cartridge laterally between cartridge loaded and unloaded positions;
    at least two carrier cam members associated with the cartridge carrier;
    a pair of laterally spaced apart carrier guide members, each carrier guide member having at least one carrier guide cam slot to receive one of the at least two carrier cam members, each carrier guide cam slot being configured:
    to permit the cartridge carrier to move laterally between cartridge loaded and unloaded positions; and
    to cause the cartridge carrier to move towards or away from the data cartridge coupler in response to movement of the one carrier cam member within the carrier guide cam slot between cartridge loaded and unloaded positions;
    wherein the cartridge carrier moves the data cartridge laterally between cartridge loaded and unloaded positions in response to lateral movement of a carrier transporter,
    wherein each carrier guide cam slot is generally S-shaped,
    wherein each carrier guide cam slot comprises a forward longitudinal slot segment extending from a front end to a rearward end, an intermediate slot segment extending and slanting downwardly from the rearward end of the forward slot segment to a rearward end of the intermediate slot segment, and rearward slot segment extending from the rearward end of the intermediate slot segment to a rearward end of the rearward slot segment,
    wherein one carrier guide cam slot of one carrier guide member is positioned vertically above the carrier guide cam slot of the other carrier guide member,
    wherein one of the carrier guide members comprises primary and secondary carrier guide cam slots,
    wherein the secondary carrier guide cam slot is positioned vertically above the primary carrier guide cam slot, and
    wherein the other of the carrier guide members comprises a single carrier guide cam slot, and wherein the secondary carrier guide cam slot is positioned vertically above the single carrier guide cam slot.

2. A device comprising a data storage cartridge loading and unloading mechanism comprising:
    a cartridge carrier for releasably receiving a data cartridge and for moving the data cartridge towards or away from a data cartridge coupler and for moving the data cartridge laterally between cartridge loaded and unloaded positions;
    at least two carrier cam members associated with the cartridge carrier;
    a pair of laterally spaced apart carrier guide members, each carrier guide member having at least one carrier guide cam slot to receive one of the at least two carrier cam members, each carrier guide cam slot being configured:
    to permit the cartridge carrier to move laterally between cartridge loaded and unloaded positions; and
    to cause the cartridge carrier to move towards or away from the data cartridge coupler in response to movement of the one carrier cam member within the carrier guide cam slot between cartridge loaded and unloaded positions;
    wherein the cartridge carrier moves the data cartridge laterally between cartridge loaded and unloaded positions in response to lateral movement of a carrier transporter,
    wherein each carrier guide cam slot is generally S-shaped,
    wherein each carrier guide cam slot comprises a forward longitudinal slot segment extending from a front end to a rearward end, an intermediate slot segment extending and slanting downwardly from the rearward end of the forward slot segment to a rearward end of the intermediate slot segment, and rearward slot segment extending from the rearward end of the intermediate slot segment to a rearward end of the rearward slot segment,
    wherein one carrier guide cam slot of one carrier guide member is positioned vertically above the carrier guide cam slot of the other carrier guide member,
    wherein one of the carrier guide members comprises primary and secondary carrier guide cam slots,
    wherein the secondary carrier guide cam slot is positioned vertically above the primary carrier guide cam slot,
    wherein the other of the carrier guide members comprises a single carrier guide cam slot, and wherein the secondary carrier guide cam slot is positioned vertically above the single carrier guide cam slot, and
    wherein the forward slot segment of the primary carrier guide cam slot is positioned laterally forward of the forward slot segment of the secondary carrier guide cam slot, wherein the forward slot segment of the secondary carrier guide cam slot is positioned vertically above and over the rearward slot segment of the primary carrier guide cam slot, and wherein the forward slot segment of the single carrier guide cam slot is positioned laterally approximately the same relative to the forward slot segment of the secondary carrier guide cam slot.

3. A data drive comprising:
a carrier transporter movable laterally between cartridge loaded and unloaded positions;
a data cartridge coupler associated with the carrier transporter which moves laterally in response to lateral movement of the carrier transporter;
a drive motor assembly for causing the carrier transporter to move laterally between cartridge loaded and unloaded positions;
a data storage cartridge loading and unloading mechanism comprising:
a cartridge carrier for releasably receiving a data storage cartridge and for moving the data cartridge towards or away from a data cartridge coupler and for moving the data cartridge laterally between cartridge loaded and unloaded positions;
at least two carrier cam members associated with the cartridge carrier;
a pair of laterally spaced apart carrier guide members, each carrier guide member having at least one carrier guide cam slot to receive one of the at least two carrier cam members, each carrier guide cam slot being configured:
to permit the cartridge carrier to move laterally between cartridge loaded and unloaded positions; and
to cause the cartridge carrier to move towards or away from the data cartridge coupler in response to movement of the one carrier cam member within the carrier guide cam slot between cartridge loaded and unloaded positions;
wherein the cartridge carrier moves the data cartridge laterally between cartridge loaded and unloaded positions in response to the lateral movement of the carrier transporter, and
wherein each carrier guide cam slot is generally S-shaped,
wherein each carrier guide cam slot comprises a forward longitudinal slot segment extending from a front end to a rearward end, an intermediate slot segment extending and slanting downwardly from the rearward end of the forward slot segment to a rearward end of the intermediate slot segment, and a rearward longitudinal slot segment extending from the rearward end of the intermediate slot segment to a rearward end of the rearward slot segment, and
wherein the forward slot segment extends generally horizontally along a first longitudinal axis, wherein the rearward slot segment extends generally horizontally along a second longitudinal axis, and wherein the second longitudinal axis is below the first horizontal axis,
wherein one of the carrier guide members comprises a primary carrier guide cam slot and a secondary carrier guide cam slot, and
wherein the other of the carrier guide members comprises a single carrier guide cam slot, and wherein the secondary carrier guide cam slot is positioned vertically above the single carrier guide cam slot.

4. The drive of claim 3, wherein the forward slot segment of the primary carrier guide cam slot is positioned laterally forward of the forward slot segment of the secondary carrier guide cam slot, wherein the forward slot segment of the secondary carrier guide cam slot is positioned vertically above and over the rearward slot segment of the primary carrier guide cam slot, and wherein the forward slot segment of the single carrier guide cam slot is positioned laterally approximately the same relative to the forward slot segment of the secondary carrier guide cam slot.

5. A data drive comprising:
a drive door pivotally mounted for pivotal movement between opened and closed positions;
a pair of laterally spaced apart first and second carrier guide panels, wherein the drive door is pivotally mounted at a forward end of each carrier guided panel for pivotal movement between opened and closed positions;
each of the carrier guide panels having a primary carrier guide cam slot and wherein the first carrier guide panel has a secondary carrier guide cam slot spaced from the primary carrier guide slot, each of the carrier guide cam slots receiving one carrier cam member for movement therein and comprising:
a forward elongated longitudinal slot segment extending rearwardly along a first longitudinal axis;
an intermediate slot segment extending rearwardly from the forward slot segment and slanting downwardly relative to the first longitudinal axis; and
a rearward elongated longitudinal slot segment extending rearwardly from the intermediate slot segment along a second longitudinal axis below the first longitudinal axis;
a cartridge carrier for releasably receiving a data storage cartridge and for moving the data cartridge towards or away from a data cartridge coupler and for moving the data cartridge laterally between cartridge loaded and unloaded positions, the cartridge carrier having laterally spaced apart first and second sides;
first and second spaced apart carrier cam members associated with the first side of the cartridge carrier, each of the first and second carrier members being received by one of the primary and secondary carrier guide cam slots of the first guide panel for movement therein;
a third carrier cam member associated with the second side of the cartridge carrier and being received by the primary carrier guide cam slot of the second guide panel for movement therein;
means associated with the first or second sides of the cartridge carrier for causing the drive door to pivot to opened or closed positions in response to lateral movement of the cartridge carrier;
wherein the cartridge carrier:
moves laterally towards or away from the drive door in response to lateral movement of a carrier transporter; and
moves towards or away from the data cartridge coupler to coupled and uncoupled positions in response to movement of the carrier cam members within the intermediate slot segments of the carrier guide cam slots,
wherein the primary carrier guide slot of the first carrier guide panel is positioned vertically above relative to the primary carrier guide slot of the second carrier guide panel,
wherein the secondary carrier guide cam slot is positioned vertically above the primary carrier guide cam slot of the first carrier guide panel, and
wherein the forward slot segment of the primary carrier guide cam slot of the first carrier guide panel is positioned laterally forward of the forward slot segment of the secondary carrier guide cam slot, wherein the forward slot segment of the secondary carrier guide cam slot is positioned vertically above and over the rearward slot segment of the primary carrier guide cam slot of the first carrier guide panel, and wherein the forward slot segment of the primary carrier guide cam slot of the second carrier guide panel is positioned laterally approximately the same relative to the forward slot segment of the secondary carrier guide cam slot.

6. A data storage cartridge loading and unloading mechanism for a data drive comprising a drive door movable between closed and opened positions, and a data cartridge coupler associated with the loading and unloading mechanism, wherein the loading and unloading mechanism comprises:
- a cartridge carrier for releasably receiving a data cartridge and for moving the data cartridge towards or away from a data cartridge coupler and for moving the data cartridge laterally between cartridge loaded and unloaded positions;
- at least two carrier cam members associated with the cartridge carrier;
- a pair of laterally spaced apart carrier guide members, each carrier guide member having at least one carrier guide cam slot to receive one of the at least two carrier cam members, each carrier guide cam slot being configured:
  - to permit the cartridge carrier to move laterally between cartridge loaded and unloaded positions; and
  - to cause the cartridge carrier to move towards or away from the data cartridge coupler in response to movement of the one carrier cam member within the carrier guide cam slot between cartridge loaded and unloaded positions; and
- means for moving the drive door to opened and closed positions in response to lateral movement of the cartridge carrier;
- wherein when the loading and unloading mechanism moves: away from the drive door, the carrier cartridge is caused to move towards the data cartridge coupler and to a coupled position; or towards the drive door and towards an unloading position, the carrier cartridge is caused to move away from the data cartridge coupler and to an uncoupled position,
- wherein each carrier guide cam slot is generally S-shaped,
- wherein each carrier guide cam slot comprises a forward longitudinal slot segment extending from a front end to a rearward end, an intermediate slot segment extending and slanting downwardly from the rearward end of the forward slot segment to a rearward end of the intermediate slot segment, and rearward slot segment extending from the rearward end of the intermediate slot segment to a rearward end of the rearward slot segment,
- wherein one carrier guide cam slot of one carrier guide member is positioned vertically above the carrier guide cam slot of the other carrier guide member,
- wherein one of the carrier guide members comprises primary and secondary carrier guide cam slots,
- wherein the secondary carrier guide cam slot is positioned vertically above the primary carrier guide cam slot, and
- wherein the other of the carrier guide members comprises a single carrier guide cam slot, and wherein the secondary carrier guide cam slot is positioned vertically above the single carrier guide cam slot.

7. The mechanism of claim 6, wherein the forward slot segment of the primary carrier guide cam slot is positioned laterally forward of the forward slot segment of the secondary carrier guide cam slot, wherein the forward slot segment of the secondary carrier guide cam slot is positioned vertically above and over the rearward slot segment of the primary carrier guide cam slot, and wherein the forward slot segment of the single carrier guide cam slot is positioned laterally approximately the same relative to the forward slot segment of the secondary carrier guide cam slot.

* * * * *